(12) United States Patent
Suzuki et al.

(10) Patent No.: US 7,889,442 B2
(45) Date of Patent: Feb. 15, 2011

(54) IMAGING LENS AND IMAGING APPARATUS

(75) Inventors: Takashi Suzuki, Saitama (JP); Taro Asami, Saitama (JP)

(73) Assignee: Fujinon Corporation, Saitama (JP)

( * ) Notice: Subject to any disclaimer, the term of this patent is extended or adjusted under 35 U.S.C. 154(b) by 157 days.

(21) Appl. No.: 12/202,015

(22) Filed: Aug. 29, 2008

(65) Prior Publication Data

US 2009/0067065 A1    Mar. 12, 2009

(30) Foreign Application Priority Data

Sep. 12, 2007    (JP)    .............................. P2007-236446

(51) Int. Cl.
G02B 9/00 (2006.01)
G02B 9/34 (2006.01)
(52) U.S. Cl. ...................... 359/754; 359/771
(58) Field of Classification Search ......... 359/754–756, 359/771–772, 749–753
See application file for complete search history.

(56) References Cited

U.S. PATENT DOCUMENTS

| 4,310,222 | A | 1/1982 | Ikemori |
| 4,671,626 | A | 6/1987 | Fukushima et al. |
| 6,324,018 | B1 | 11/2001 | Kawamura |
| 7,364,077 | B2 * | 4/2008 | Wolf, II ...................... 235/454 |
| 7,423,820 | B2 * | 9/2008 | Taniyama ................... 359/791 |
| 7,474,479 | B2 * | 1/2009 | Isono .......................... 359/779 |
| 2004/0190161 | A1 | 9/2004 | Yamamoto |
| 2004/0212901 | A1 | 10/2004 | Nanba et al. |
| 2006/0238898 | A1 | 10/2006 | Shinohara |
| 2008/0266678 | A1 * | 10/2008 | Tang ............................ 359/781 |
| 2009/0034099 | A1 * | 2/2009 | Nakamura .................. 359/773 |
| 2009/0052053 | A1 * | 2/2009 | Iyama ........................ 359/691 |

FOREIGN PATENT DOCUMENTS

| CN | 2280640 Y | 5/1998 |
| EP | 1 757 967 A2 | 2/2007 |
| JP | 6-75163 A | 3/1994 |

(Continued)

OTHER PUBLICATIONS

European Office Action, May 17, 2010.

(Continued)

*Primary Examiner*—Jordan M. Schwartz
(74) *Attorney, Agent, or Firm*—Birch, Stewart, Kolasch & Birch, LLP

(57) ABSTRACT

An imaging lens is provided and includes: a stop; and a lens group disposed between the stop and an imaging plane of the imaging lens and having a positive power as a whole. The lens group has an air lens formed by an air gap between lenses adjacent to each other, and the imaging lens satisfies conditional expression (1):

$$-8 < L \times (1/Ra_2 - 1/Ra_1) < -3 \qquad (1)$$

$Ra_1$ represents a radius of curvature of an object-side surface of the air lens which has a convex shape and is closest to an image side of the imaging lens in the lens group, $Ra_2$ represents a radius of curvature of an image-side surface of the air lens, and L represents a distance on an optical axis of the imaging lens from an object-side surface of a lens closest to an object side in the imaging lens to an imaging plane.

15 Claims, 16 Drawing Sheets

FOREIGN PATENT DOCUMENTS

| | | |
|---|---|---|
| JP | 6-94992 A | 4/1994 |
| JP | 9-43508 A | 2/1997 |
| JP | 10-10425 | 1/1998 |
| JP | 11-237547 A | 8/1999 |
| JP | 2000-249913 A | 9/2000 |
| JP | 2004-325713 A | 11/2004 |
| JP | 2005-148615 | 6/2005 |
| JP | 2005-202019 | 7/2005 |
| JP | 2006-030290 | 2/2006 |
| JP | 2007-34314 A | 2/2007 |
| JP | 2007-218947 A | 8/2007 |

OTHER PUBLICATIONS

Chinese Office Action, State Intellectual Property Office of People's Republic of China; Aug. 24, 2010.

* cited by examiner

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

IMAGING LENS AND IMAGING APPARATUS

This application is based on and claims priority under 35 U.S.C §119 from Japanese Patent Application No. 2007-236446, filed on Sep. 12, 2007, the entire disclosure of which is herein incorporated by reference.

BACKGROUND OF THE INVENTION

1. Field of the Invention

The present invention relates to an imaging lens and an imaging apparatus, more particularly, to an imaging lens suitable to be used in a surveillance camera, a cell phone camera, an onboard camera, and the like employing an imaging device such as a CCD (Charge Coupled Device) and a CMOS (Complementary Metal Oxide Semiconductor), and an imaging apparatus having the imaging lens.

2. Description of Related Art

Recently, systems, which have imaging apparatuses such as cameras mounted on a vehicle, for recognizing external environment by taking images of the front, the side, the rear, and the like of a vehicle, that is, for example, systems for sensing a line painted on a road (including a white line, a yellow line, and the like) or detecting obstacles have been practically used. In onboard lenses applied to such onboard cameras, it is important that the onboard lens is made to be a fast optical system and has a good imaging performance. Also, in the onboard lenses, it is important that a small part of the lens is exposed to the outside in consideration of an exterior view of a vehicle.

However, in such onboard lenses, by reflection of light such as headlight of the oncoming vehicle on a lens surface at the time of using an onboard lens, sometimes ghost image is formed. Sometimes the formed ghost image may reduce recognizability with respect to external environment depending on its level.

Particularly, in onboard cameras using solid-state imaging devices such as CCD, an image is displayed on an imaging plane by employing an auto gain function for automatically setting brightness sensitivity, and thus the following arises. A ghost image formed on an imaging plane by multiple reflections is darker than a headlight image formed on the imaging plane by headlight of the oncoming vehicle that is transmitted through a lens system without reflection. Even when the ghost image is formed in a state where the headlight image of the oncoming vehicle remains in the imaging plane, the auto gain function sets a gain based on bright light of the headlight. Thus, a low gain is set, and so the ghost image does not very stand out.

However, even after the oncoming vehicle passed and the headlight image disappeared, sometimes the ghost image remains in the imaging plane because of multiple reflections caused by headlight from the outside of the imaging plane. After the headlight image disappeared from the imaging plane, the auto gain function changes the setting into a high gain. Thus, before the change, the ghost image did not stand out since it was dark, but after the change, the ghost image becomes bright and is displayed. Hence, there is concern that the brightly displayed ghost image is erroneously recognized as headlight of another new vehicle, at the time when the gain is switched.

SUMMARY OF THE INVENTION

An object of an illustrative, non-limiting embodiment of the invention is to provide an imaging lens capable of suppressing occurrence of an undesirable ghost image while maintaining good optical performance; an imaging apparatus including the imaging lens; and a vehicle including the imaging apparatus.

According to an aspect of the invention, there is provided an imaging lens comprising: a stop; and a lens group disposed between the stop and an imaging plane of the imaging lens and having a positive power as a whole. The lens group has an air lens formed by an air gap between lenses adjacent to each other, and the imaging lens satisfies conditional expression (1):

$$-8 < L \times (1/Ra_2 - 1/Ra_1) < -3 \quad (1)$$

where $Ra_1$ represents a radius of curvature of an object-side surface of the air lens which has a convex shape and is closest to an image side of the imaging lens in the lens group, $Ra_2$ represents a radius of curvature of an image-side surface of the air lens, and L represents a distance on an optical axis of the imaging lens from an object-side surface of a lens closest to an object side in the imaging lens to an imaging plane.

In calculating L as mentioned above, air-converted distance is used for the back focal length.

In a lens system, which includes an aperture diaphragm, and a lens group disposed between the aperture diaphragm and the imaging plane and having a positive power as a whole, the lens group having the air lens having a convex shape, after the first reflection on the image-side surface of the air lens and the second reflection on the object-side surface thereof, a ghost image has a tendency to be formed on the imaging plane. In addition, when such lens system is applied to an onboard lens, the ghost image formed by the aforementioned reflection of headlight of the oncoming vehicle has a tendency to remain in an imaging plane even after the headlight image goes out of the imaging plane.

To prevent the undesirable ghost image as described above, it is required that the ghost image caused by the headlight is not displayed on the imaging plane or the ghost image itself is reduced after the headlight image goes out of the imaging plane.

In an imaging lens according to an aspect of the invention, the conditional expression (1) is satisfied with respect to the object-side surface and the image-side surface of the air lens having a convex shape and being closest to the image side in the lens group. Thus, it is possible to minimize occurrence of an undesirable ghost image on the imaging plane in both cases where a light source such as a headlight is inside and outside the imaging plane.

The imaging lens may further satisfy conditional expression (2):

$$0.3 < K/f < 1.0 \quad (2)$$

where K represents a distance on the optical axis from the object-side surface of the air lens which has a convex shape and is closest to the image side in the lens group to the imaging plane, and f represents a focal length of the imaging lens.

The imaging lens may further satisfy conditional expression (3):

$$-4 < f/Re < 0.2 \quad (3)$$

where f represents a focal length of the imaging lens, and Re represents a radius of curvature of an image-side surface of a lens closest to the image side in the imaging lens.

Here, values of the conditional expression (1) to (3) are those obtained when d-line (wavelength 587.6 nm) is set as a reference wavelength. In the present specification, the d-line is assumed as a reference wavelength if there is no specific description.

In the imaging lens, the image-side surface of the air lens which has a convex shape and which is closest to the image side in the lens group may have a convex shape.

In the imaging lens, at least one lens surface exposed to air may have an anti-reflection coating having a reflectance of less than 2% for light having a wavelength of 800 nm.

The at least one air surface may be exposed to the air lens which has a convex shape and which is closest to the image side in the lens group.

Here, in the present specification, it is defined that "reflectance" is that obtained when light is vertically incident on the center of a lens.

In addition, in the present specification, it is defined that "lens" has a finite power and does not include a plane parallel plate. Further, "lens surface" is defined as an optical surface, through which light forming an image is transmitted, of surfaces belonging to "lens".

The imaging lens may be mounted on a vehicle to take an outside image of the vehicle.

According to another aspect of the invention, there is provided an imaging apparatus including: the imaging lens as described above; and an imaging device converting an optical image formed by the imaging lens into an electric signal.

According to still another aspect of the invention, there is provided a vehicle including an imaging lens according to an aspect of the invention or an imaging apparatus according to an aspect of the invention.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

In an imaging lens according to an exemplary embodiment of the invention, with respect to the air lens surface, which tends to cause an undesirable ghost image, in the lens configuration having a possibility to cause the ghost image, since the conditional expression (1) is satisfied, it is possible to suppress occurrence of an undesirable ghost image on the imaging plane while securing good optical performance. In addition, an imaging apparatus according to an exemplary embodiment of the invention has the imaging lens. Hence, it is difficult to generate an undesirable ghost image as compared with the past, and thus it is possible to provide a more accurate image. In addition, a vehicle according to an exemplary embodiment of the invention has the imaging apparatus according to the aspect of the invention. Hence, it is possible to reduce recognition error caused by the ghost image that occurred in the past thereby improving safety.

Hereinafter, exemplary embodiments of the invention will be described in detail with reference to the drawings. First, an imaging lens according to an exemplary embodiment of the invention wilt be described.

Figure 1:
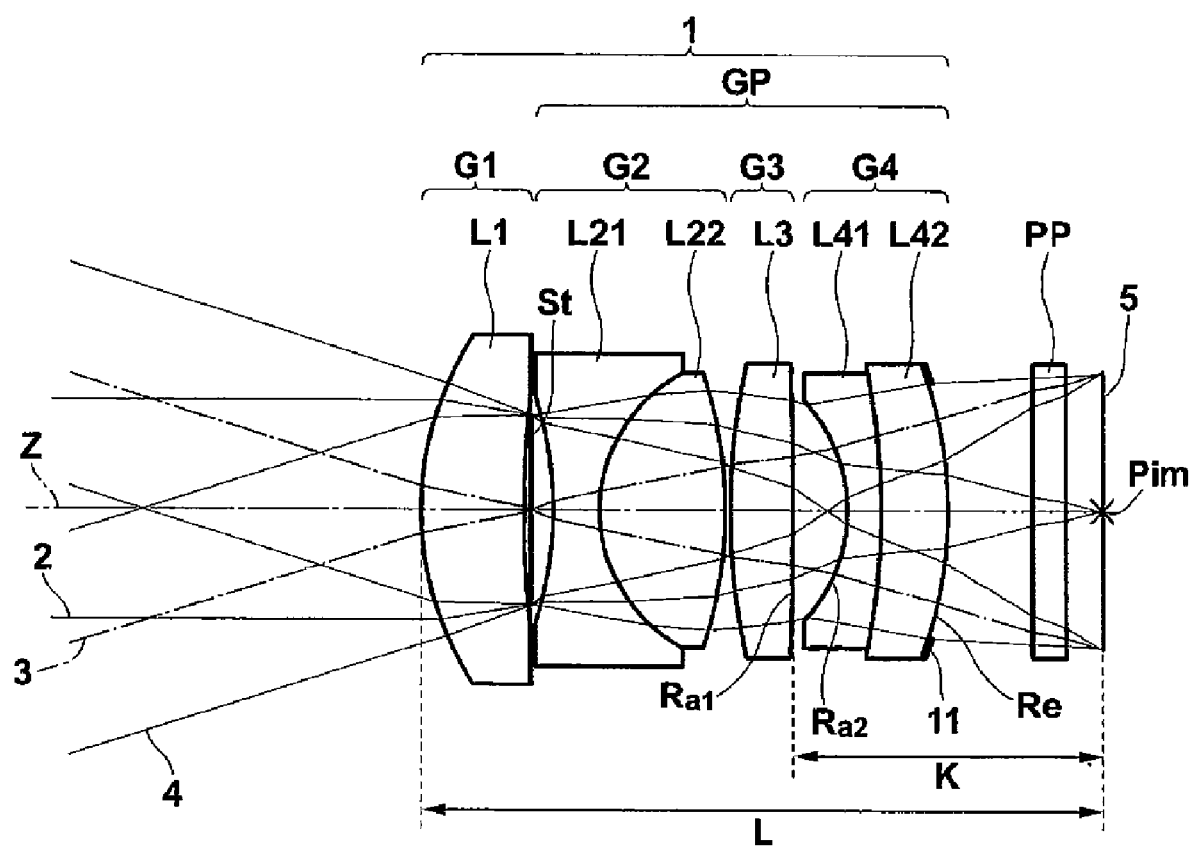
FIG. 1 is an optical path diagram showing an imaging lens according to an exemplary embodiment of the invention.

FIG. 1 shows a lens sectional view of an imaging lens 1 according to an exemplary embodiment of the invention. In addition, an exemplary configuration shown in FIG. 1 corresponds to a lens configuration according to Example 1 to be described later. In addition, FIGS. 7 to 17 show other exemplary configurations according to the embodiment of the invention, and those correspond to lens configurations according to Examples 2 to 12 to be described later. In Examples 1 to 12, a basic configuration is the same, and thus hereinafter the imaging lens having the configuration shown in FIG. 1 will be described with reference to examples.

In addition, FIG. 1 also shows an outermost marginal ray 2 of on-axis rays, a principal ray 3 of off-axis rays, and an outermost marginal ray 4 of the off-axis rays. Further, in FIG. 1, there is also illustrated an imaging device 5 disposed on an image plane including an imaging position Pim of the imaging lens, in consideration of the case where the imaging lens is applied to an imaging apparatus. The imaging device 5 is for converting an optical image formed by the imaging lens into an electric signal, and includes, for example, CCD image sensor and the like.

In addition, when the imaging device 5 is applied to an imaging apparatus, it is possible to disposed a cover glass, a low pass filter, an infrared-cut film, or the like in accordance with a configuration of a camera side on which the lens system is mounted. In FIG. 1, there is shown an example in which an optical member PP assumed as one of those and having a plane parallel plate shape is disposed between the lens system and the imaging device 5. For example, when the imaging lens is used in an onboard camera as a night vision camera for eyesight at nighttime, for example, a filter for cutting blue light from ultraviolet light may be interleaved between the lens system and the imaging device.

In addition, a filter of various types such as a low pass filter or the like for cutting a specific wavelength band may be disposed between the lens system and the imaging device 5. Instead, the filter of various types may be disposed between the respective lenses. Alternatively, a coating having the same effect as the filters of various types may be performed on a surface of any one lens.

The imaging lens 1 having the exemplary configuration shown in FIG. 1 includes, in order from the object side, a first lens group G1, an aperture diaphragm St as an exemplary embodiment of a stop, a second lens group G2, a third lens group G3, and a fourth lens group G4. The first lens group G1 is a lens L1, the second lens group G2 is a cemented lens formed by cementing a lens L21 and a lens L22, the third lens group G3 is a lens L3, and the fourth lens group G4 is a cemented lens formed by cementing a lens L41 and lens L42. In addition, the aperture diaphragm St shown in FIG. 1 does not illustrate a shape and a size thereof, but illustrates a position thereof on the optical axis Z.

The imaging lens 1 according to the embodiment, as a particular configuration, includes an aperture diaphragm St, and a lens group GP that is disposed between the aperture diaphragm St and an imaging plane and has a positive power as a whole. In addition, when a radius of curvature of an object-side surface of an air lens having a convex shape (hereinafter, it is referred to as a convex air lens) and being closest to an image side in the lens group GP is $Ra_1$, a radius of curvature of an image-side surface of the air lens is $Ra_2$, and a distance on an optical axis from an object-side surface of a lens closest to an object side in the whole system to an imaging plane is L, the imaging lens 1 is configured to satisfy the following conditional expression (1).

$$-8 < L \times (1/Ra_2 - 1/Ra_1) < -3 \tag{1}$$

In the example shown in FIG. 1, the lens group GP has a second lens group G2, a third lens group G3, and a fourth lens group G4. In addition, the air lens is formed by an air gap between lenses adjacent to each other. In the example shown in FIG. 1, the convex air lens is formed by an air gap between the lens L3 and the lens L41, and is a meniscus lens of which the image-side surface has a convex shape.

In addition, the convex air lens may be formed as not only the meniscus lens shown in FIG. 1 but also a biconvex lens or a plano-convex lens as shown in an example to be described later. However, when the image-side surface thereof is formed in a convex shape so that the conditional expression (1) is satisfied, it is possible to more effectively suppress an undesirable ghost image.

In the lens system including the aperture diaphragm, and the lens group that is disposed between the aperture diaphragm and the imaging plane has a positive power as a whole, the lens group has the air lens having a convex shape. In the configuration of the lens system, after the first reflection on the image-side surface of the air lens and the second reflection on the object-side surface thereof, a ghost image has a tendency to be formed on the imaging plane. The conditional expression (1) defines an allowable range with respect to radiuses of curvature of these two surfaces that has a tendency to cause an undesirable ghost image.

When the value falls below the lower limit of the conditional expression (1), a refractive power of the convex air lens becomes too strong, and thus it is difficult to satisfactorily correct aberration. When the upper limit of the conditional expression (1) is exceeded, $(1/Ra_2 - 1/Ra_1)$ approaches 0. Thus, deference between radiuses of curvature of the object-side surface and image-side surface of the convex air lens decreases, a ghost image tends to be formed in an imaging plane in a case where the image-side surface of the air lens is a first reflection surface and the object-side surface thereof is a second reflection surface.

Figure 2:
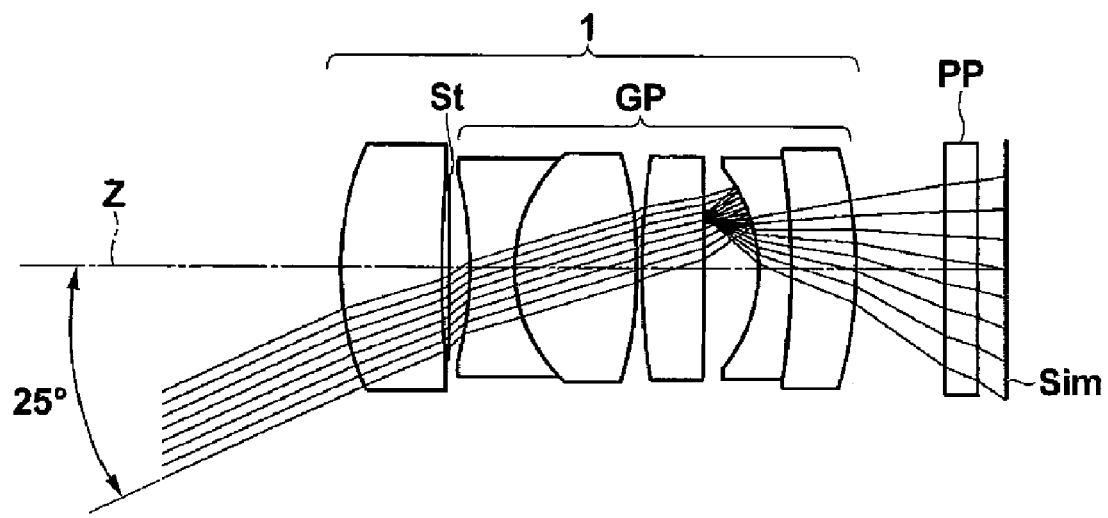
FIG. 2 is a light ray-tracing diagram of multiple reflections in the imaging lens shown in FIG. 1.

In the imaging lens 1 having the configuration shown in FIG. 1, FIG. 2 is a diagram showing propagation of light rays under a simulation of multiple reflections. The simulation thereof is performed when the light rays are incident at an angle of 25 degrees, the image-side surface of the air lens is a first reflection surface, and the object-side surface thereof is a second reflection surface. As shown in FIG. 2, these rays become divergent light, and spread in a large area in an imaging plane Sim. Therefore, it can be said that an undesirable ghost image is not formed.

Figure 3:
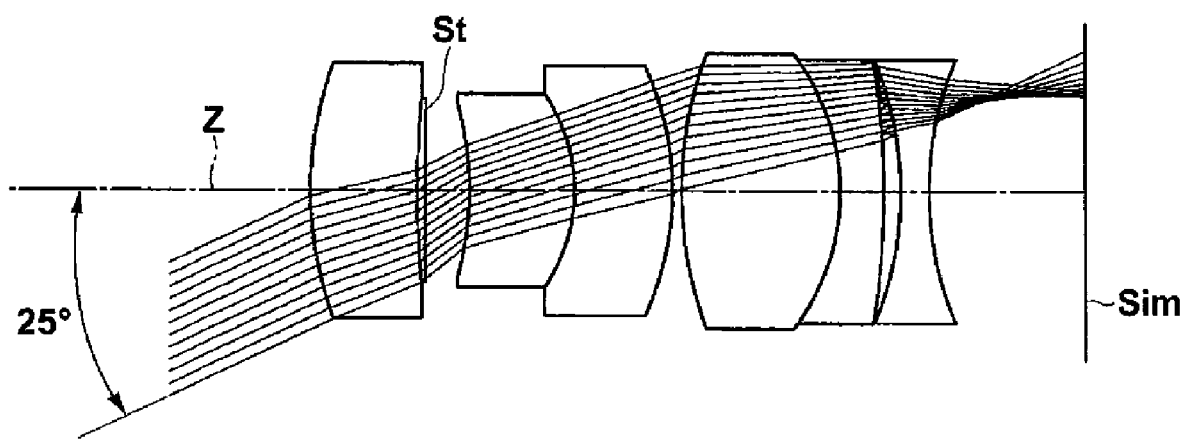
FIG. 3 is a light ray-tracing diagram of multiple reflections in an imaging lens shown according to a comparative example.

In a comparative example that does not satisfy the conditional expression (1), similarly to FIG. 2, FIG. 3 shows propagation of light rays incident at an angle of 25 degrees when the image-side surface of the air lens is a first reflection surface and the object-side surface thereof is a second reflection surface. As shown in FIG. 3, these rays are condensed on an imaging plane Sim. Therefore, an undesirable ghost image is formed.

In addition, the comparative example shown in FIG. 3 corresponds to a lens configuration of Example 1 described in Japanese Patent Application No. 2007-93304. This comparative example includes an aperture diaphragm St, and a lens group that is disposed between the aperture diaphragm St and an imaging plane Sim and has a positive power as a whole. In addition, an air lens used for reflection is formed by an air gap between a lens closest to the image side and a lens adjacent thereto on the object side.

Here, the incident angle of 25 degrees is larger than a half angle of view of 17.7 degrees in a designed specification of the imaging lens 1 and a half angle of view of 17.6 degrees in a designed specification of the comparative example. In addition, a size of the imaging plane Sim shown in FIGS. 2 and 3 represents an image height displayed on an imaging plane of a display device. That is, in the example that has the same incident angle and does not satisfy the conditional expression (1) as shown in FIG. 3, there is a high possibility that an undesirable ghost image is formed by a light source outside the imaging plane. However, in the example that satisfies the conditional expression (1) as shown in FIG. 2, there is a rare possibility that an undesirable ghost image is formed by the light source outside the imaging plane. In a case of an onboard lens, when an undesirable ghost image is formed by the light source outside the imaging plane, there is a concern that recognition error is caused by a headlight of the oncoming vehicle that just passed. However, under simulation condition in the imaging lens 1 according to the embodiment, there is no concern about that.

In addition, in the imaging lens 1, it is verified that an undesirable ghost image is also not formed when the light rays are incident at an angle of 25 degrees, the imaging plane Sim is a first reflection surface, and the image-side surface of the lens closest to the image side in the whole system is a second reflection surface.

According to the embodiment, the imaging lens may satisfy the following conditional expression (1-2). In this case, it becomes easier to suppress an undesirable ghost image while satisfactorily correcting aberration.

$$-6 < L \times (1/Ra_2 - 1/Ra_1) < -3 \quad (1\text{-}2)$$

In addition, according to the embodiment of the invention, when a distance on the optical axis from the object-side surface of the convex air lens to the imaging plane is K and a focal length of the whole system is f, the imaging lens may satisfy the following conditional expression (2).

$$0.3 < K/f < 1.0 \quad (2)$$

When the value falls below the lower limit of the conditional expression (2), the convex air lens becomes too close to the imaging plane, and a size of a ghost image decreases. Hence, ray density increases, brightness of the ghost image increases, and thus possibility to be an undesirable ghost image increases. When the upper limit of the conditional expression (2) is exceeded, the convex air lens becomes too far from the imaging plane, imaging performance deteriorates, and thus it is difficult to obtain a fine image.

According to the embodiment, the imaging lens may satisfy the following conditional expression (2-2). In this case, it becomes easier to suppress an undesirable ghost image while maintaining good imaging performance.

$$0.4 < K/f < 0.8 \quad (2\text{-}2)$$

In addition, according to the embodiment, when the focal length of the whole system is f and a radius of curvature of an image-side surface of a lens closest to the image side in the whole system is Re, the imaging lens may satisfy the following conditional expression (3).

$$-4 < f/Re < 0.2 \quad (3)$$

When the values falls below the lower limit of the conditional expression (3), the radius of curvature of the image-side surface of the lens closest to the image side in the whole system becomes too small. Thus, it is difficult to satisfactorily maintain imaging performance. When the lower limit of the conditional expression (3) is exceeded, a ghost image tends to be formed in an imaging plane in a case where the imaging plane is a first reflection surface and the image-side surface of the lens closest to the image side in the whole system is a second reflection surface.

Figure 4:
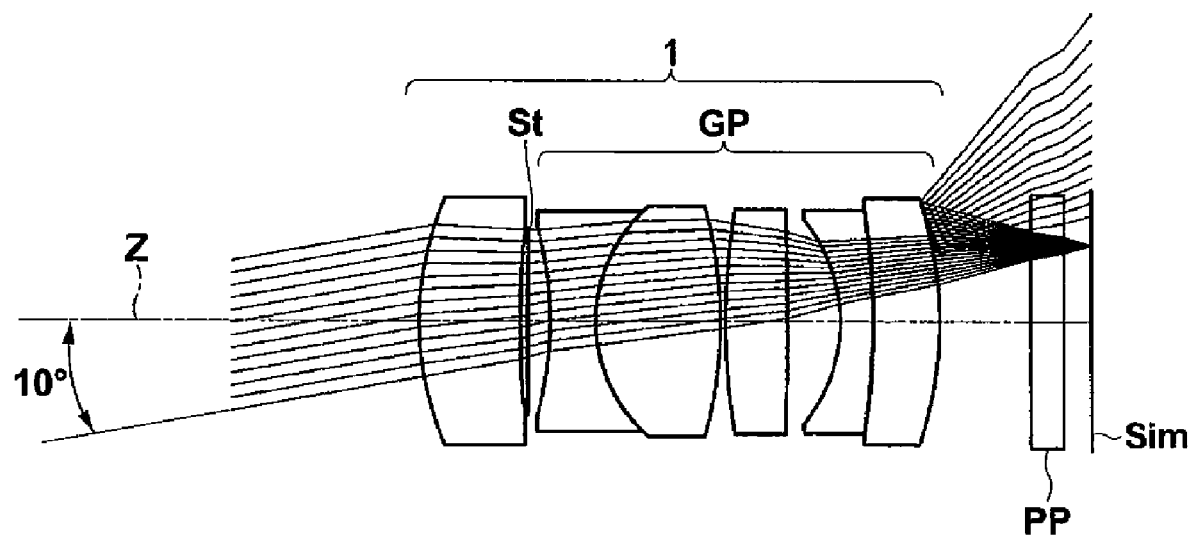
FIG. 4 is a light ray-tracing diagram of multiple reflections in the imaging lens shown in FIG. 1.

In the imaging lens 1 having the configuration shown in FIG. 1, FIG. 4 is a diagram showing propagation of light rays under a simulation of multiple reflections. The simulation thereof is performed when the light rays are incident at an angle of 10 degrees, the imaging plane Sim is a first reflection surface, and the image-side surface of the lens closest to the image side in the whole system is a second reflection surface. In addition, FIG. 4 shows light ray-tracing when the optical member PP is disposed on a plane perpendicular to the optical axis Z. As shown in FIG. 4, these rays become divergent light, and mostly are positioned outside the imaging plane. Hence, an undesirable ghost image is not formed in the imaging plane.

Figure 5:
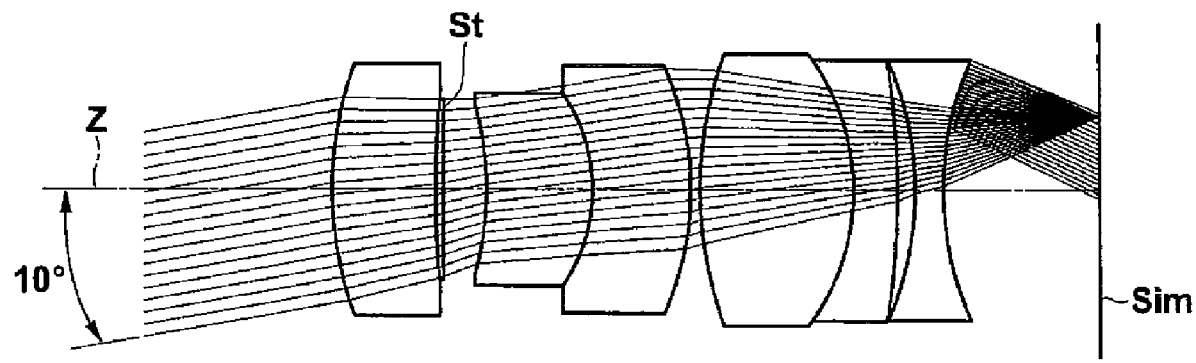
FIG. 5 is a light ray-tracing diagram of multiple reflections in the imaging lens shown according to the comparative example.

In a comparative example that is the same as that of FIG. 4 and does not satisfy the conditional expression (3), similarly to FIG. 3, FIG. 5 shows propagation of rays incident at an angle of 10 degrees when the image-side surface of the convex air lens is a first reflection surface and the object-side surface thereof is a second reflection surface. As shown in FIG. 5, these light rays are vertically incident on the center of the imaging plane Sim, and light ray density is high. Hence, there is a high possibility that an undesirable ghost image is formed.

Here, the incident angle of 10 degrees is smaller than a half angle of view of 17.7 degrees in a designed specification of the imaging lens 1 and a half angle of view of 17.6 degrees in a designed specification of the comparative example. In addition, a size of the imaging plane Sim shown in FIGS. 4 and 5 represents an image height displayed on an imaging plane of a display device. That is, FIGS. 4 and 5 show existence and nonexistence of a ghost image that is formed by a light source in the imaging plane. In the example that has the same incident angle and does not satisfy the conditional expression (3) as shown in FIG. 5, there is a high possibility that an undesirable ghost image is formed. However, in the example that satisfies the conditional expression (3) as shown in FIG. 4, there is a rare possibility that an undesirable ghost image is formed.

According to the embodiment, the imaging lens may satisfy the following conditional expression (3-2). In this case, it becomes easier to suppress an undesirable ghost image while maintaining good imaging performance.

$$-2.8 < f/Re < -0.2 \quad (3\text{-}2)$$

In addition, in the imaging lens according to the embodiment, an anti-reflection coating for making reflectance of less than 2% at a wavelength of 800 nm may be provided on at least one lens surface that is exposed to air. In this case, the anti-reflection coating may be provided on at least one air surface of the convex air lens.

When the imaging lens is used as a surveillance camera or a camera for nighttime, it is required to have a small size and high sensitivity with respect to infrared light. The anti-reflection coating is configured to satisfy the requirement mentioned above. When reflectance of the anti-reflection coating at a wavelength of 800 nm is more than 2%, reflection intensity of infrared light increases, and thus ghost image intensity of infrared light becomes strong.

In addition, even though the imaging lens satisfies the conditional expressions (1) and (2), it is difficult to perfectly prevent occurrence of a ghost image caused by a headlight and the like positioned in the imaging plane. Hence, the anti-reflection coating may be provided on a surface of the convex air lens tending to cause an undesirable ghost image.

The simulation about the ghost image in FIG. 2 shows that the reflection on the object-side surface and the image-side surface of the air lens occurs in a surface having a small absolute value of the radius of curvature thereof or is caused by light being incident and exiting at a large angle with respect to the normal line of the reflection surface. Specifically, the reflection occurs when light is diagonally incident at a large incident angle.

As for a general characteristic of an anti-reflection coating, it has been known that an available wavelength band thereof is shifted toward a short wavelength side in a case of inclined incidence, as compared with a case of perpendicular incidence. In this point, to decrease intensity of the ghost image formed by a headlight and the like, which are multiply reflected on the surface of the convex air lens, in the imaging plane, the available wavelength band of the anti-reflection coating may be previously set to be extended toward a long wavelength side. Accordingly, the reflection characteristic of the anti-reflection coating may be previously set as described above.

In addition, in the imaging lens according to the embodiment, an anti-reflection coating for making reflectance of less than 2% at a wavelength of 900 nm less than 2% may be provided on at least one lens surface that is exposed to air.

In addition, there is a concern that light rays passing through out of the effective diameter reach the image plane as stray light and become a ghost image, and thus it is better to shield the stray light by providing light shielding means. Examples of the shielding means may include an opaque coating material and an opaque plate member provided on a portion outside the effective diameter of a lens. Alternatively, the stray light may be shielded by providing an opaque plate member on the optical path of the stray light, as the shielding means. In FIG. 1, there is shown an example in which shielding means 11 is provided on the surface of the lens L42 facing toward the image side.

In addition, in the imaging lens having a configuration shown in FIG. 1, the aperture diaphragm St is disposed between the first lens group G1 and the second lens group G2. With such a configuration, it is possible to position the entrance pupil to be close to the object side while satisfactorily correcting comatic aberration. Therefore, the configuration is advantageous in view of performance.

However, arrangement of the aperture diaphragm St is not limited to the example shown in FIG. 1, and the aperture diaphragm St may be disposed closest to the object side as shown in an example to be described later. By disposing the aperture diaphragm St to be close to the object side, it is possible to position an entrance pupil on the object side while satisfactorily correcting aberration. With such a configuration, a ray height in a lens close to the object side decreases, and thus it is possible to decrease an effective diameter of the lens. Therefore, it is possible to decrease an exposed area of the lens. For example, when the lens is employed in an onboard camera, it is required to reduce the exposed area of the lens in order not to disfigure an exterior view. Hence, the configuration mentioned above is advantageous. In addition, the lens can be downsized and unweighted in that the effective diameter of the lens can be decreased.

In Examples 1 to 12 to be described later, all lenses were made of glass. Likewise, in the imaging lens according to the embodiment, lenses in the whole system may be made of glass, or may be made of transparent ceramic or plastic.

In addition, when the imaging lens is used in severe environment such as onboard camera, a lens disposed closest to the object side may have high resistivity with respect to temperature variance caused by direct rays and surface deterioration caused by rainstorm. In addition, the lens may be made of a material having high resistivity with respect to chemicals such as oils and cleansers, that is, a material having high water resistance, high antiweatherability, high acid resistance, and high chemical resistance.

In addition, as a material of the lens disposed closest to the object side, it is possible to use a material that is hard and is scarcely broken, and specifically, it is possible to use glass or transparent ceramics. The ceramics has properties of higher stiffness than normal glass and high heat resistance.

In addition, when the imaging lens is applied to an onboard camera, it is required to be available in a wide temperature range from outside air in a cold region to a vehicle inside in summer of a tropical region. When the imaging lens is used in the wide temperature range, it is possible to use lens material having a small linear expansion coefficient.

In addition, in order to manufacture a low-cost lens, it is possible that all lenses be formed as spherical lenses. Alternatively, in order to satisfactorily correct aberrations, an aspheric lens may be used. In addition, in order to form aspheric surface with high accuracy and low cost, the lens may be made of plastic.

EXAMPLES

Hereinafter, numerical examples of the imaging lens according to the invention will be described in detail.

Example 1

Table 1 shows lens data and various data of the imaging lens according to Example 1. In the lens data of Table 1, a surface number represents the sequential number of i-th (i=1, 2, 3 . . . ) surface that sequentially increases as it gets closer to the image side when a surface of a component closest to the object side is defined as a first surface. In addition, in the lens data of Table 1, the surface numbers are also noted on the aperture diaphragm St and the optical member PP.

In Table 1, Ri represents a radius of curvature of i-th (i=1, 2, 3 . . . ) surface, and Di represents an on-axis surface spacing on the optical axis Z between the i-th (i=1, 2, 3 . . . ) surface and the (i+1)th surface on the optical. In addition, Ndj represents a refractive index at the d-line in a j-th (j=1, 2, 3 . . . ) optical element of which the sequential number sequentially increases as it gets closer to the image side when a surface of the optical element closest to the object side is defined as a first surface. In addition, vdj represents an Abbe number of the j-th optical element with respect to d-line. In Table 1, units of the radius of curvature and the on-axis surface spacing are mm. In addition, a direction in which the radius of curvature is convex toward the object side is defined as a positive direction, and a direction in which the radius of curvature is convex toward the image side is defined as a negative direction.

In the various data shown in Table 1, FNo. represents an F number, f represents a focal length of the whole system, K represents a distance on the optical axis from the object-side surface of the convex air lens to the imaging plane, L represents a distance on the optical axis Z from the object-side surface of the lens closest to the object side in the whole system to the imaging plane (the back focus part is air-converted), co represents a half angle of view, and Bf represents an air-convelted back focus. In the various data shown in Table 1, a unit of co is degree, and all units other than the units of FNo. and ω are mm. In addition, the reference signs in Table 1 have the same meaning as the reference signs in examples to be described later.

TABLE 1

Example 1

| SURFACE NUMBER | Ri | Di | Ndj | vdj |
|---|---|---|---|---|
| 1 | 8.66 | 2.80 | 1.8348 | 42.7 |
| 2 | 28.03 | 0.19 | | |
| 3(APERTURE DIAPHRAGM) | ∞ | 0.61 | | |
| 4 | −9.95 | 1.24 | 1.7174 | 29.5 |
| 5 | 4.26 | 3.40 | 1.8348 | 42.7 |
| 6 | −11.65 | 0.14 | | |

TABLE 1-continued

Example 1

| SURFACE NUMBER | Ri | Di | Ndj | vdj |
|---|---|---|---|---|
| 7 | 19.26 | 1.70 | 1.8348 | 42.7 |
| 8 | −119.56 | 1.47 | | |
| 9 | −4.43 | 0.91 | 1.6129 | 37.0 |
| 10 | −19.92 | 1.82 | 1.7725 | 49.6 |
| 11 | −10.98 | 2.27 | | |
| 12 | ∞ | 0.90 | 1.5231 | 54.5 |
| 13 | ∞ | 1.00 | | |
| 14(IMAGE PLANE) | ∞ | | | |

FNo. = 2.0, f = 12.0, K = 8.37, L = 18.1, ω = 17.7, Bf = 3.87

Figure 6:
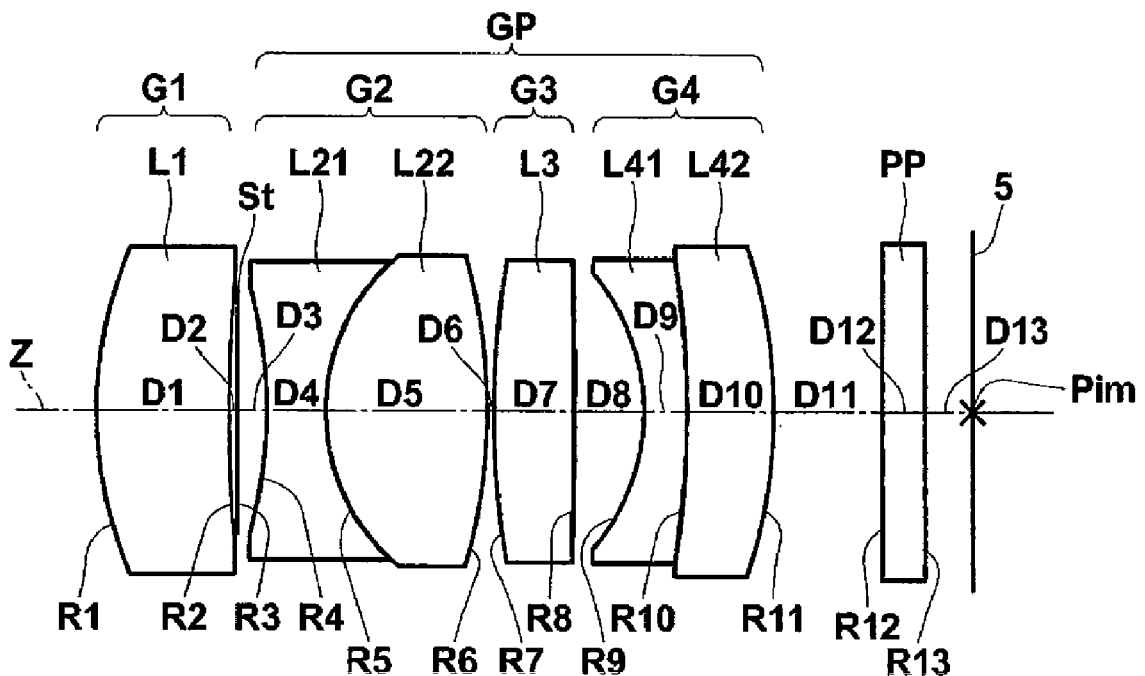
FIG. 6 is a sectional diagram showing a configuration of an imaging lens according to Example 1.

FIG. 6 is a lens configuration diagram illustrating the lens according to Example 1. In FIG. 6, the reference signs Ri and Di (i=1, 2, 3 . . . ) correspond to the Ri and the Di in Table 1. In addition, the reference signs in FIG. 6 are also noted on the aperture diaphragm St and the optical member PP.

Example 2

Figure 7:
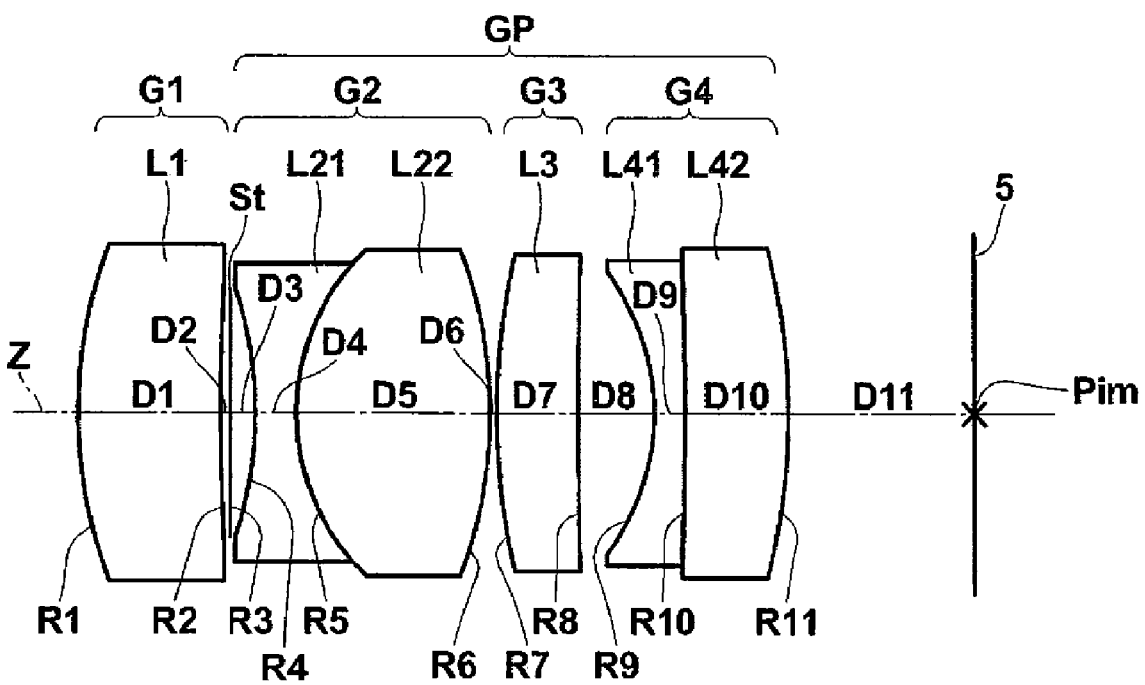
FIG. 7 is a sectional diagram showing a configuration of an imaging lens according to Example 2.

Table 2 shows lens data and various data of the imaging lens according to Example 2. FIG. 7 shows a lens configuration diagram. In FIG. 7, the reference signs Ri and Di correspond to the Ri and the Di in Table 2. In the exemplary configuration according to Example 2 shown in Table 2 and FIG. 7, the optical member PP is not included. However, similarly to the other examples in the lens system according to Example 2, the optical member PP also can be employed to be interleaved between the lens system and the image plane.

TABLE 2

Example 2

| SURFACE NUMBER | Ri | Di | Ndj | vdj |
|---|---|---|---|---|
| 1 | 10.01 | 3.00 | 1.8348 | 42.7 |
| 2 | 52.27 | 0.21 | | |
| 3(APERTURE DIAPHRAGM) | ∞ | 0.54 | | |
| 4 | −8.10 | 0.85 | 1.7174 | 29.5 |
| 5 | 4.67 | 4.06 | 1.8348 | 42.7 |
| 6 | −9.65 | 0.15 | | |
| 7 | 14.50 | 1.71 | 1.8348 | 42.7 |
| 8 | 106.69 | 1.60 | | |
| 9 | −4.91 | 0.65 | 1.6129 | 37.0 |
| 10 | −78.58 | 2.15 | 1.62041 | 60.3 |
| 11 | −13.65 | 3.88 | | |
| 12(IMAGE PLANE) | ∞ | | | |

FNo. = 2.0, f = 12.0, K = 8.29, L = 18.8, ω = 17.6, Bf = 3.88

Example 3

Figure 8:
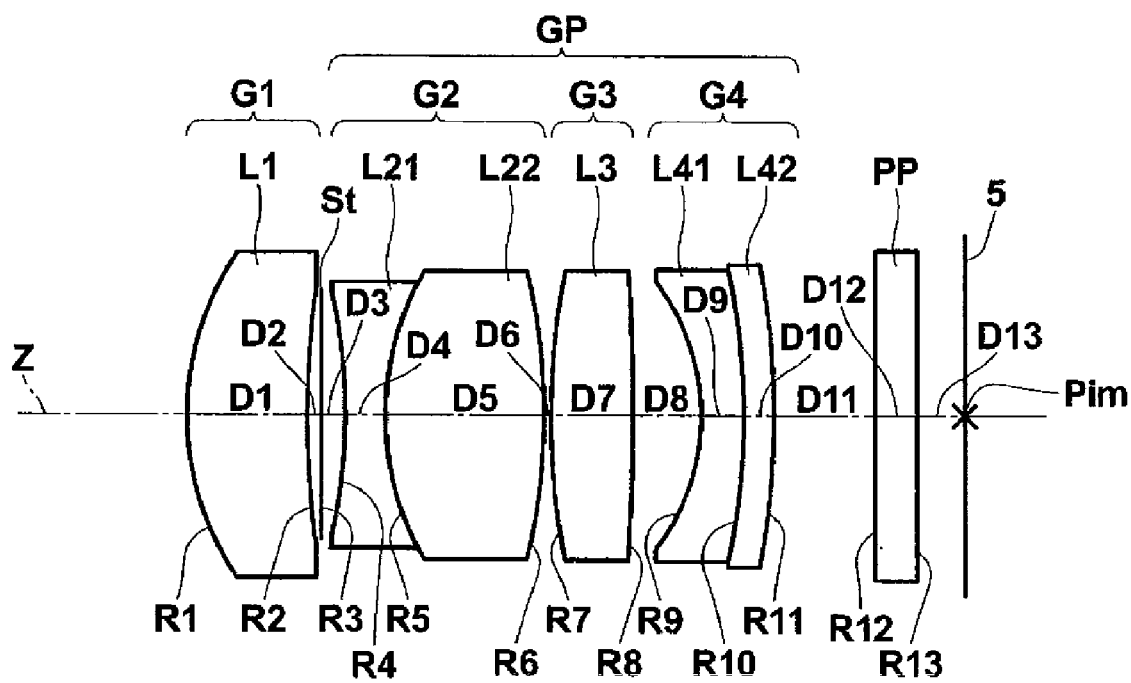
FIG. 8 is a sectional diagram showing a configuration of an imaging lens according to Example 3.

Table 3 shows lens data and various data of the imaging lens according to Example 3. FIG. 8 shows a lens configuration diagram. In FIG. 8, the reference signs Ri and Di correspond to the Ri and the Di in Table 3.

TABLE 3

Example 3

| SURFACE NUMBER | Ri | Di | Ndj | vdj |
|---|---|---|---|---|
| 1 | 6.20 | 2.54 | 1.7130 | 53.9 |
| 2 | 20.00 | 0.30 | | |
| 3(APERTURE DIAPHRAGM) | ∞ | 0.50 | | |
| 4 | −12.19 | 0.88 | 1.7174 | 29.5 |
| 5 | 6.02 | 3.40 | 1.7130 | 53.9 |
| 6 | −12.97 | 0.14 | | |

TABLE 3-continued

Example 3

| SURFACE NUMBER | Ri | Di | Ndj | vdj |
|---|---|---|---|---|
| 7 | 15.96 | 1.70 | 1.8348 | 42.7 |
| 8 | −56.16 | 1.46 | | |
| 9 | −4.67 | 0.91 | 1.6129 | 37 |
| 10 | −14.47 | 0.66 | 1.5168 | 64.2 |
| 11 | −16.29 | 2.16 | | |
| 12 | ∞ | 0.90 | 1.5168 | 64.2 |
| 13 | ∞ | 1.00 | | |
| 14(IMAGE PLANE) | ∞ | | | |

FNo. = 2.0, f = 12.3, K = 7.10, L = 16.2, ω = 17.0, Bf = 3.76

Example 4

Figure 9:
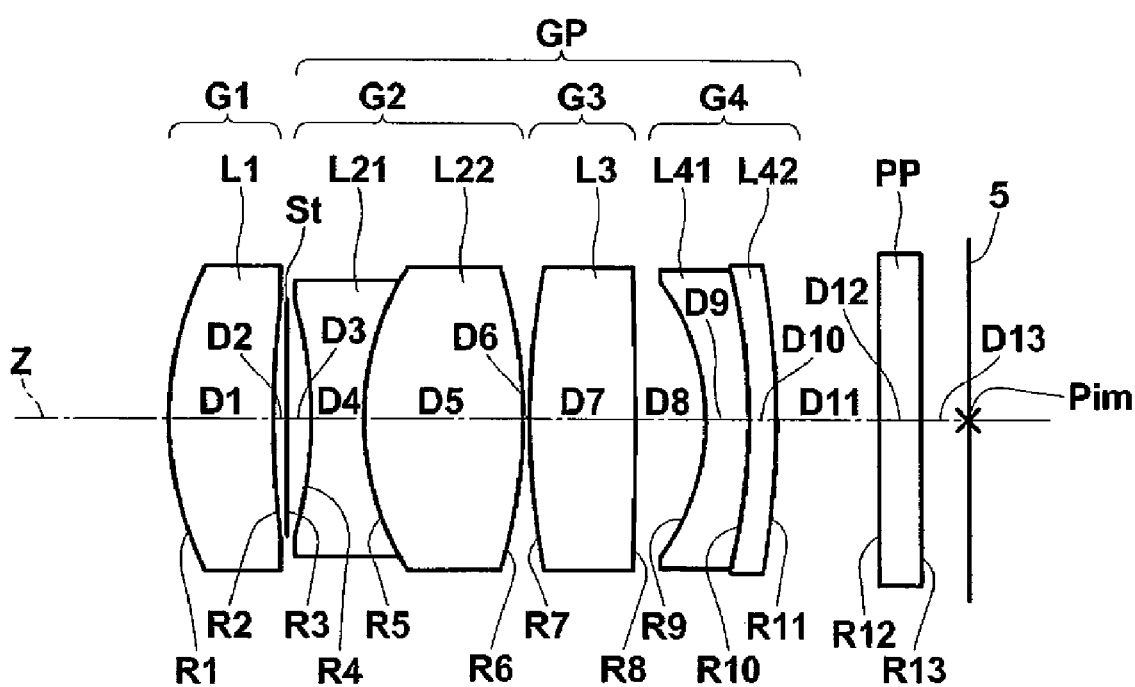
FIG. 9 is a sectional diagram showing a configuration of an imaging lens according to Example 4.

Table 4 shows lens data and various data of the imaging lens according to Example 4. FIG. 9 shows a lens configuration diagram. In FIG. 9, the reference signs Ri and Di correspond to the Ri and the Di in Table 4.

TABLE 4

Example 4

| SURFACE NUMBER | Ri | Di | Ndj | vdj |
|---|---|---|---|---|
| 1 | 7.18 | 2.19 | 1.7550 | 52.3 |
| 2 | 21.02 | 0.30 | | |
| 3(APERTURE DIAPHRAGM) | ∞ | 0.50 | | |
| 4 | −9.22 | 1.13 | 1.7174 | 29.5 |
| 5 | 5.89 | 3.40 | 1.8348 | 42.7 |
| 6 | −10.96 | 0.13 | | |
| 7 | 16.51 | 2.19 | 1.8348 | 42.7 |
| 8 | −95.85 | 1.49 | | |
| 9 | −4.86 | 0.91 | 1.6129 | 37 |
| 10 | −12.93 | 0.59 | 1.5168 | 64.2 |
| 11 | −17.73 | 2.18 | | |
| 12 | ∞ | 0.90 | 1.5168 | 64.2 |
| 13 | ∞ | 1.00 | | |
| 14(IMAGE PLANE) | ∞ | | | |

FNo. = 2.0, f = 11.3, K = 7.08, L = 16.6, ω = 18.6, Bf = 3.78

Example 5

Figure 10:
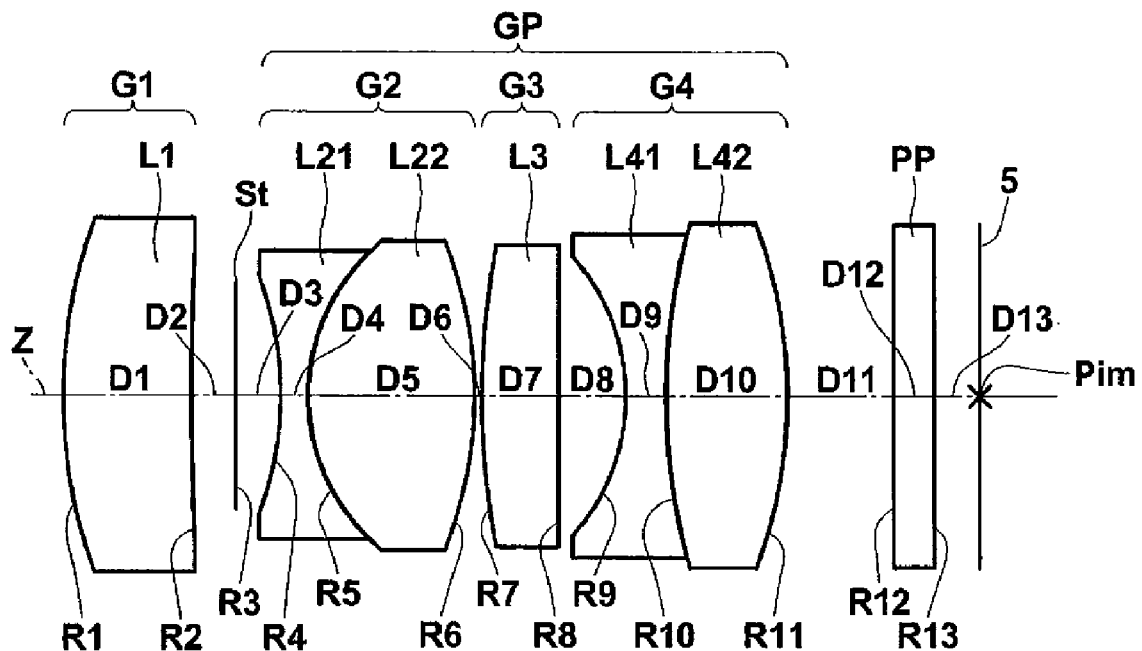
FIG. 10 is a sectional diagram showing a configuration of an imaging lens according to Example 5.

Table 5 shows lens data and various data of the imaging lens according to Example 5. FIG. 10 shows a lens configuration diagram. In FIG. 10, the reference signs Ri and Di correspond to the Ri and the Di in Table 5.

TABLE 5

Example 5

| SURFACE NUMBER | Ri | Di | Ndj | vdj |
|---|---|---|---|---|
| 1 | 11.03 | 2.85 | 1.8348 | 42.7 |
| 2 | 66.25 | 0.99 | | |
| 3(APERTURE DIAPHRAGM) | ∞ | 1.00 | | |
| 4 | −7.50 | 0.60 | 1.7174 | 29.5 |
| 5 | 4.46 | 3.63 | 1.8348 | 42.7 |
| 6 | −8.99 | 0.15 | | |
| 7 | 17.59 | 1.70 | 1.8348 | 42.7 |
| 8 | ∞ | 1.46 | | |
| 9 | −4.64 | 0.91 | 1.6129 | 37.0 |
| 10 | 14.03 | 2.66 | 1.7725 | 49.6 |
| 11 | −10.98 | 2.32 | | |
| 12 | ∞ | 0.90 | 1.5231 | 54.5 |
| 13 | ∞ | 1.00 | | |
| 14(IMAGE PLANE) | ∞ | | | |

FNo. = 2.0, f = 12.0, K = 9.25, L = 19.9, ω = 17.7, Bf = 3.91

Example 6

Figure 11:
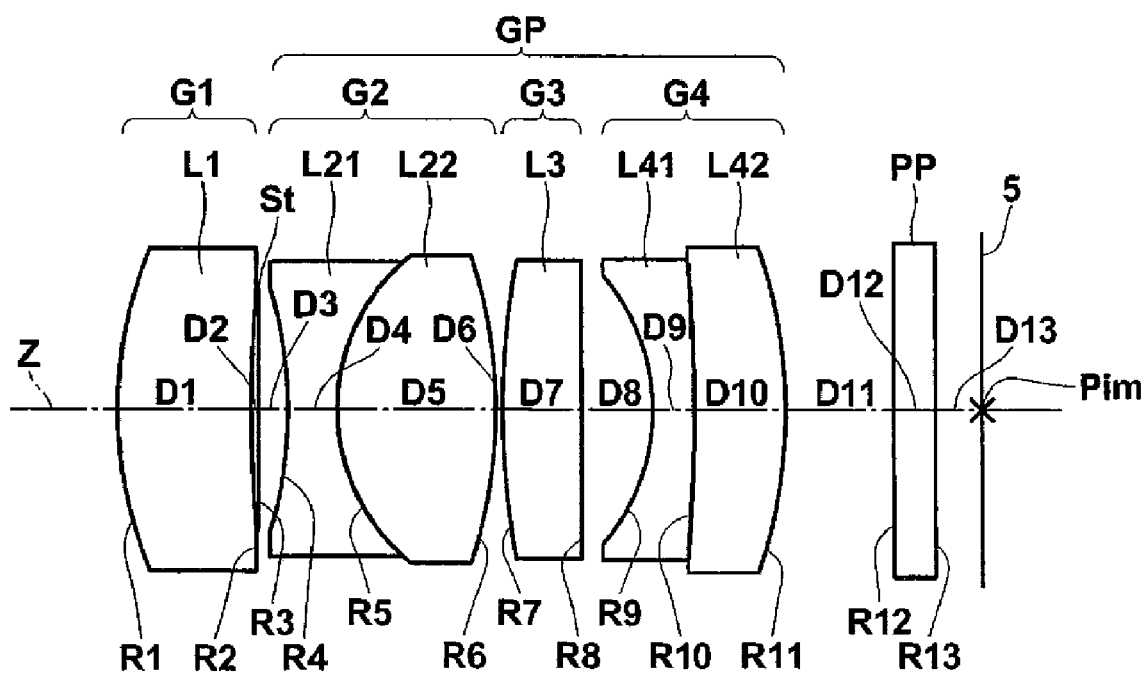
FIG. 11 is a sectional diagram showing a configuration of an imaging lens according to Example 6.

Table 6 shows lens data and various data of the imaging lens according to Example 6. FIG. 11 shows a lens configuration diagram. In FIG. 11, the reference signs Ri and Di correspond to the Ri and the Di in Table 6.

TABLE 6

Example 6

| SURFACE NUMBER | Ri | Di | Ndj | vdj |
|---|---|---|---|---|
| 1 | 8.99 | 2.92 | 1.8348 | 42.7 |
| 2 | 32.56 | 0.16 | | |
| 3(APERTURE DIAPHRAGM) | ∞ | 0.64 | | |
| 4 | −8.93 | 1.04 | 1.7174 | 29.5 |
| 5 | 4.26 | 3.40 | 1.8348 | 42.7 |
| 6 | −10.60 | 0.14 | | |
| 7 | 17.38 | 1.70 | 1.8348 | 42.7 |
| 8 | ∞ | 1.53 | | |
| 9 | −4.37 | 0.91 | 1.6129 | 37.0 |
| 10 | −36.64 | 1.94 | 1.7725 | 49.6 |
| 11 | −10.98 | 2.31 | | |
| 12 | ∞ | 0.90 | 1.5231 | 54.5 |
| 13 | ∞ | 1.00 | | |
| 14(IMAGE PLANE) | ∞ | | | |

FNo. = 2.0, f = 12.0, K = 8.60, L = 18.3, ω = 17.7, Bf = 3.90

Example 7

Figure 12:
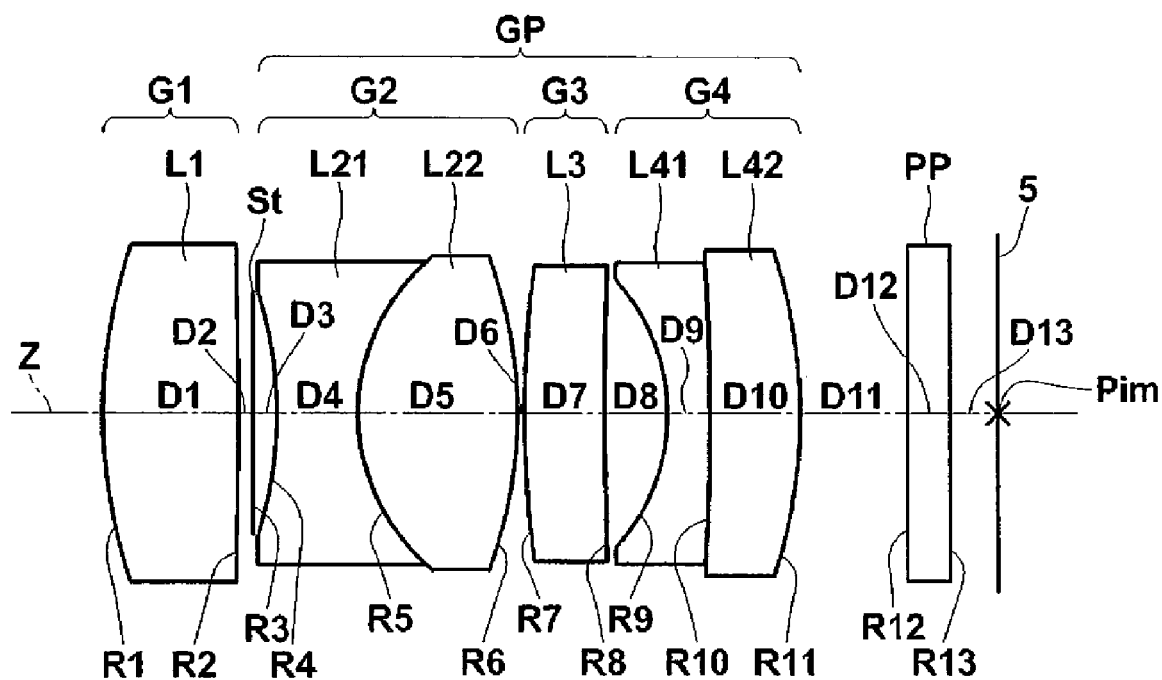
FIG. 12 is a sectional diagram showing a configuration of an imaging lens according to Example 7.

Table 7 shows lens data and various data of the imaging lens according to Example 7. FIG. 12 shows a lens configuration diagram. In FIG. 12, the reference signs Ri and Di correspond to the Ri and the Di in Table 7.

TABLE 7

Example 7

| SURFACE NUMBER | Ri | Di | Ndj | vdj |
|---|---|---|---|---|
| 1 | 10.65 | 2.89 | 1.8348 | 42.7 |
| 2 | −121.87 | 0.30 | | |
| 3(APERTURE DIAPHRAGM) | ∞ | 0.50 | | |
| 4 | −8.52 | 1.71 | 1.7174 | 29.5 |
| 5 | 4.29 | 3.40 | 1.8348 | 42.7 |
| 6 | −9.20 | 0.14 | | |
| 7 | 22.58 | 1.70 | 1.8348 | 42.7 |
| 8 | 78.35 | 1.32 | | |
| 9 | −4.24 | 0.91 | 1.6129 | 37.0 |
| 10 | −47.65 | 1.88 | 1.7725 | 49.6 |
| 11 | −10.98 | 2.29 | | |
| 12 | ∞ | 0.90 | 1.5231 | 54.5 |
| 13 | ∞ | 1.00 | | |
| 14(IMAGE PLANE) | ∞ | | | |

FNo. = 2.0, f = 12.0, K = 8.31, L = 18.6, ω = 17.7, Bf = 3.88

Example 8

Figure 13:
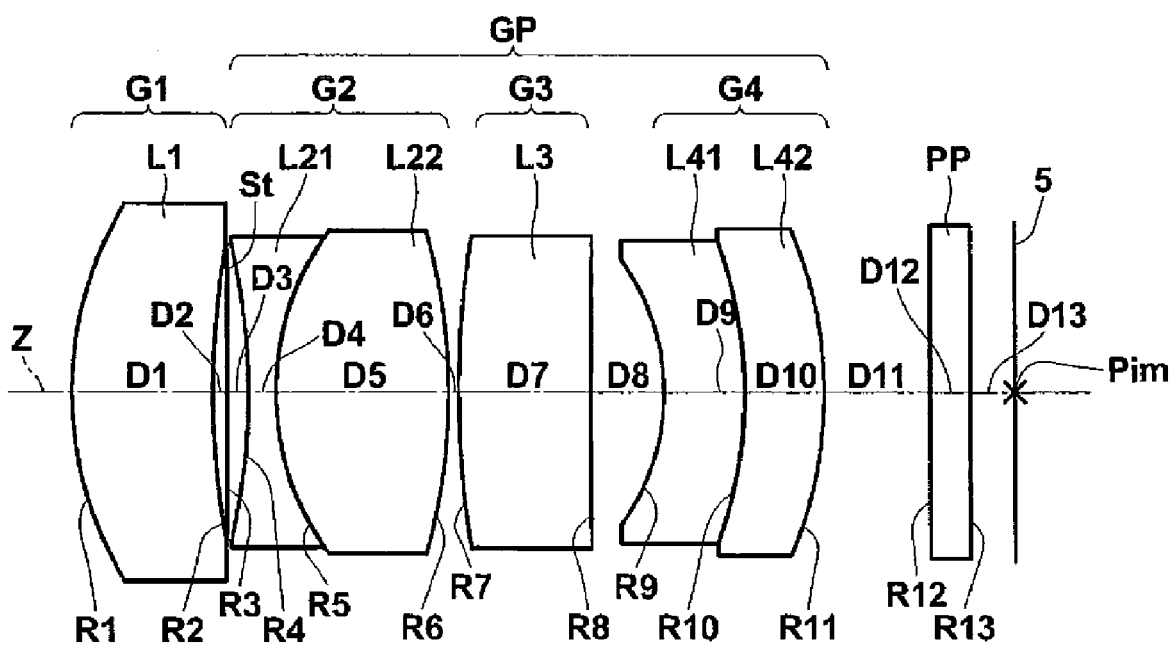
FIG. 13 is a sectional diagram showing a configuration of an imaging lens according to Example 8.

Table 8 shows lens data and various data of the imaging lens according to Example 8. FIG. 13 shows a lens configuration diagram. In FIG. 13, the reference signs Ri and Di correspond to the Ri and the Di in Table 8.

TABLE 8

Example 8

| SURFACE NUMBER | Ri | Di | Ndj | vdj |
|---|---|---|---|---|
| 1 | 8.20 | 3.16 | 1.8340 | 37.2 |
| 2 | 19.38 | 0.30 | | |
| 3(APERTURE DIAPHRAGM) | ∞ | 0.50 | | |
| 4 | −13.91 | 0.61 | 1.6727 | 32.1 |
| 5 | 6.09 | 3.87 | 1.7130 | 53.9 |
| 6 | −13.01 | 0.23 | | |
| 7 | 20.77 | 3.00 | 1.8348 | 42.7 |
| 8 | 341.18 | 1.62 | | |
| 9 | −5.07 | 1.81 | 1.8467 | 23.8 |
| 10 | −9.62 | 1.76 | 1.5168 | 64.2 |
| 11 | −9.26 | 2.38 | | |
| 12 | ∞ | 0.90 | 1.5168 | 64.2 |
| 13 | ∞ | 1.00 | | |
| 14(IMAGE PLANE) | ∞ | | | |

FNo. = 2.0, f = 15.7, K = 9.49, L = 20.9, ω = 13.5, Bf = 3.98

Example 9

Figure 14:
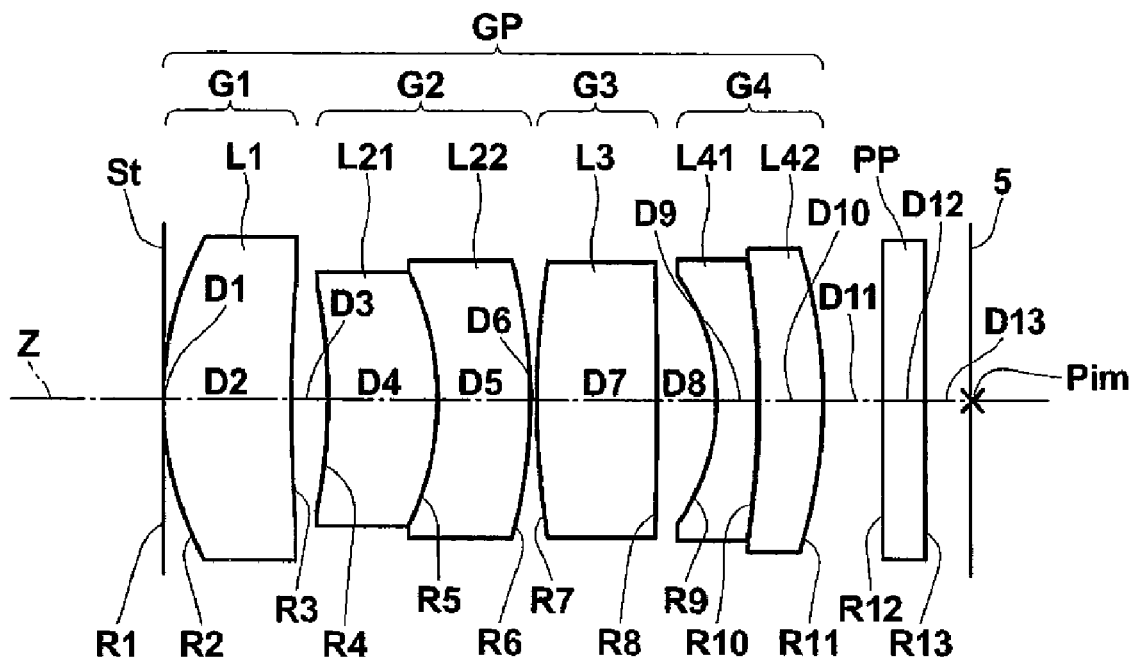
FIG. 14 is a sectional diagram showing a configuration of an imaging lens according to Example 9.

Table 9 shows lens data and various data of the imaging lens according to Example 9. FIG. 14 shows a lens configuration diagram. In FIG. 14, the reference signs Ri and Di correspond to the Ri and the Di in Table 9.

TABLE 9

Example 9

| SURFACE NUMBER | Ri | Di | Ndj | vdj |
|---|---|---|---|---|
| 1(APERTURE DIAPHRAGM) | ∞ | 0.00 | | |
| 2 | 7.26 | 2.79 | 1.8348 | 42.7 |
| 3 | 30.67 | 0.80 | | |
| 4 | −13.13 | 2.36 | 1.8830 | 40.8 |
| 5 | −6.40 | 2.00 | 1.9229 | 18.9 |
| 6 | −11.65 | 0.14 | | |
| 7 | 19.26 | 2.63 | 1.8348 | 42.7 |
| 8 | −124.62 | 1.31 | | |
| 9 | −4.76 | 0.91 | 1.8467 | 23.8 |
| 10 | −19.92 | 1.38 | 1.7725 | 49.6 |
| 11 | −10.98 | 1.28 | | |
| 12 | ∞ | 0.90 | 1.5231 | 54.5 |
| 13 | ∞ | 1.00 | | |
| 14(IMAGE PLANE) | ∞ | | | |

FNo. = 2.0, f = 12.2, K = 6.78, L = 17.2, ω = 17.1, Bf = 2.87

Example 10

Figure 15:
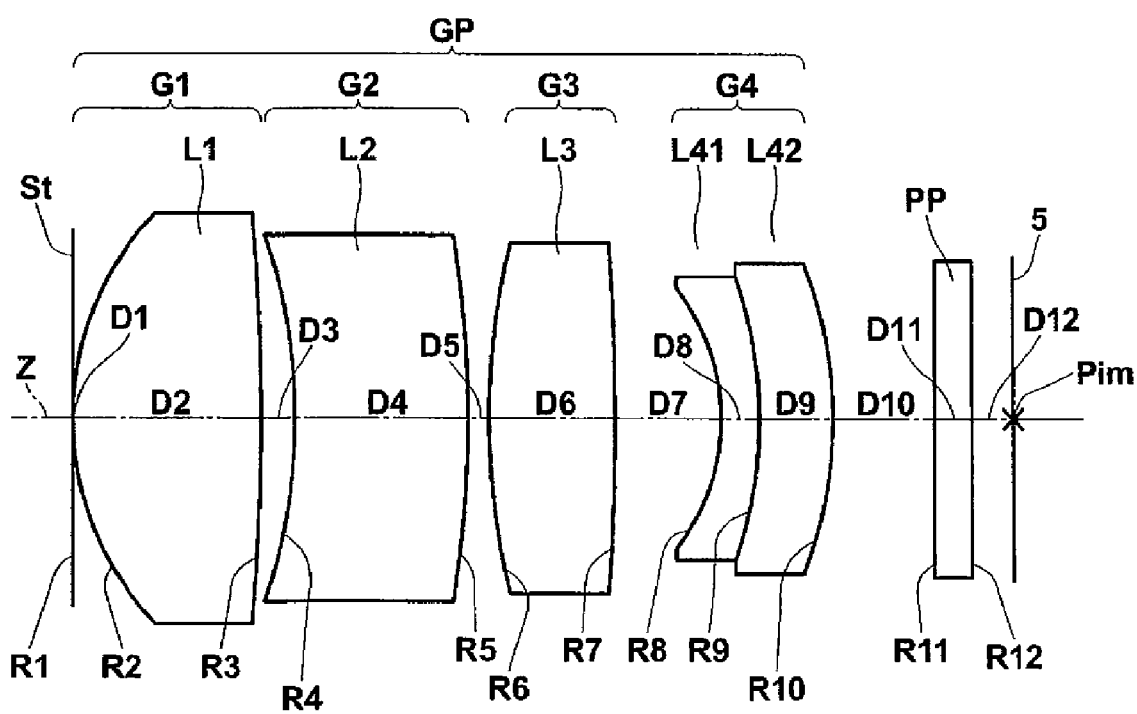
FIG. 15 is a sectional diagram showing a configuration of an imaging lens according to Example 10.

Table 10 shows lens data and various data of the imaging lens according to Example 10. FIG. 15 shows a lens configuration diagram. In FIG. 15, the reference signs Ri and Di correspond to the Ri and the Di in Table 10.

TABLE 10

Example 10

| SURFACE NUMBER | Ri | Di | Ndj | vdj |
|---|---|---|---|---|
| 1(APERTURE DIAPHRAGM) | ∞ | 0.00 | | |
| 2 | 7.05 | 4.51 | 1.5168 | 64.2 |
| 3 | −53.85 | 0.81 | | |
| 4 | −13.25 | 4.09 | 1.9229 | 18.9 |
| 5 | −27.13 | 0.50 | | |
| 6 | 17.37 | 3.00 | 1.7130 | 53.9 |
| 7 | −57.00 | 2.54 | | |
| 8 | −5.06 | 0.91 | 1.9229 | 18.9 |
| 9 | −10.10 | 1.74 | 1.8830 | 40.8 |
| 10 | −10.05 | 2.37 | | |
| 11 | ∞ | 0.90 | 1.5231 | 54.5 |

TABLE 10-continued

Example 10

| SURFACE NUMBER | Ri | Di | Ndj | vdj |
|---|---|---|---|---|
| 12 | ∞ | 1.00 | | |
| 13(IMAGE PLANE) | ∞ | | | |

FNo. = 2.0, f = 17.9, K = 9.46, L = 22.1, ω = 11.8, Bf = 3.96

Example 11

Figure 16:
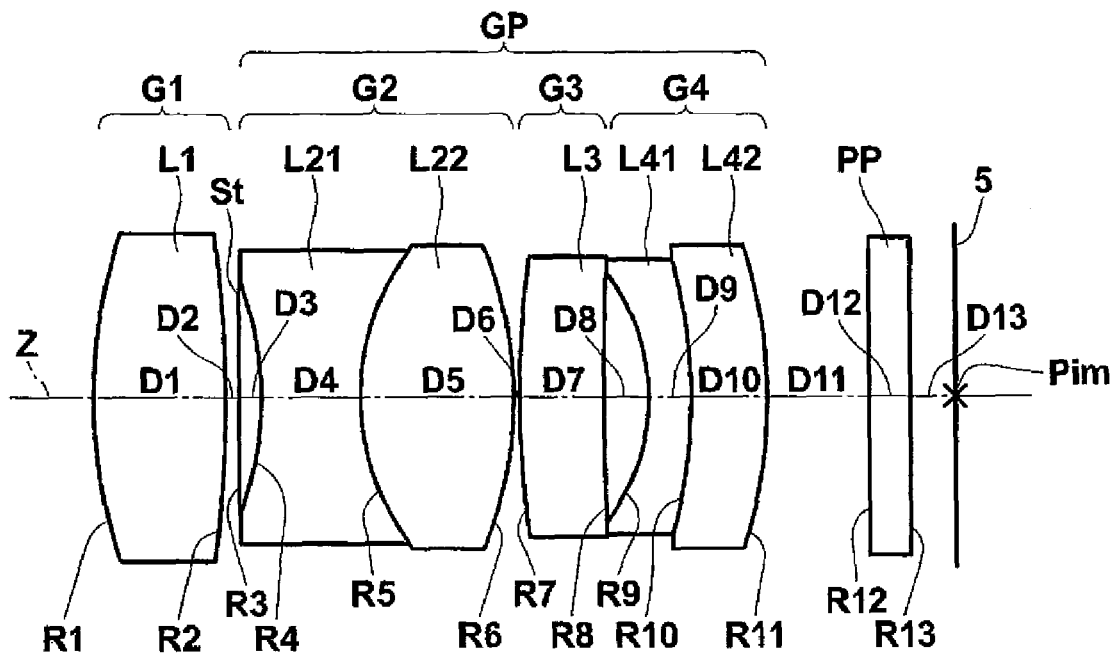
FIG. 16 is a sectional diagram showing a configuration of an imaging lens according to Example 11.

Table 11 shows lens data and various data of the imaging lens according to Example 11. FIG. 16 shows a lens configuration diagram. In FIG. 16, the reference signs Ri and Di correspond to the Ri and the Di in Table 11.

TABLE 11

Example 11

| SURFACE NUMBER | Ri | Di | Ndj | vdj |
|---|---|---|---|---|
| 1 | 11.68 | 2.90 | 1.7550 | 52.3 |
| 2 | −27.45 | 0.30 | | |
| 3(APERTURE DIAPHRAGM) | ∞ | 0.50 | | |
| 4 | −7.23 | 2.15 | 1.6200 | 36.3 |
| 5 | 5.45 | 3.40 | 1.8348 | 42.7 |
| 6 | −8.55 | 0.14 | | |
| 7 | 22.45 | 1.89 | 1.8348 | 42.7 |
| 8 | 71.46 | 0.98 | | |
| 9 | −4.56 | 0.91 | 1.9229 | 18.9 |
| 10 | −11.46 | 1.67 | 1.8830 | 40.8 |
| 11 | −10.98 | 2.27 | | |
| 12 | ∞ | 0.90 | 1.5231 | 54.5 |
| 13 | ∞ | 1.00 | | |
| 14(IMAGE PLANE) | ∞ | | | |

FNo. = 2.0, f = 11.9, K = 7.73, L = 18.7, ω = 17.7, Bf = 3.86

Example 12

Figure 17:
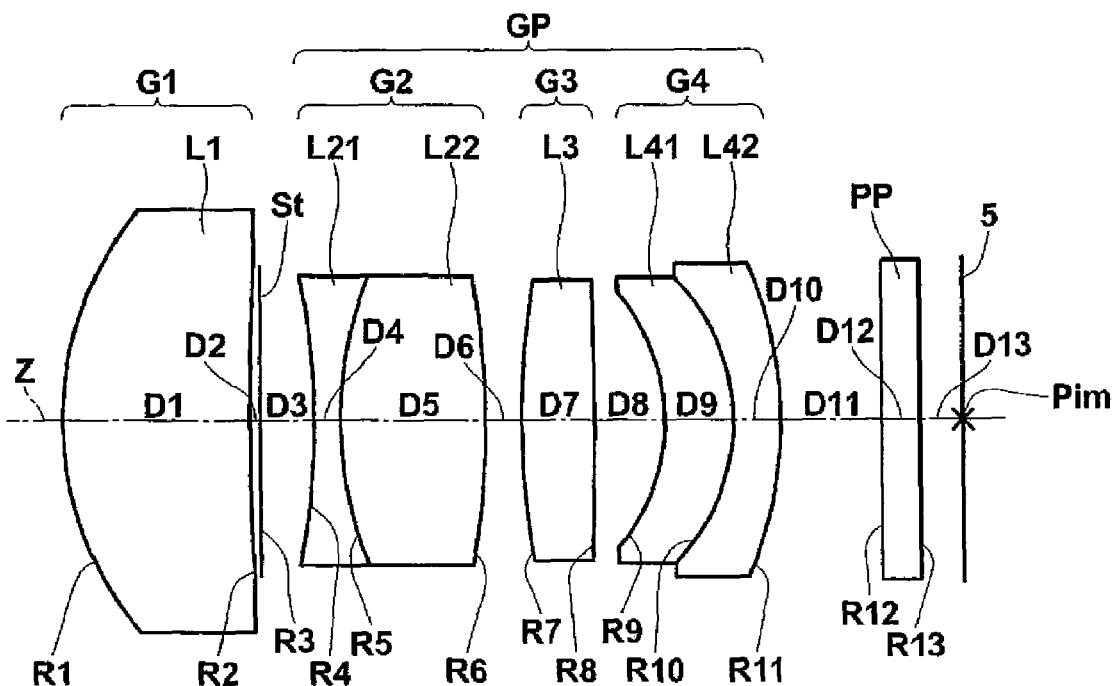
FIG. 17 is a sectional diagram showing a configuration of an imaging lens according to Example 12.
Figure 18:
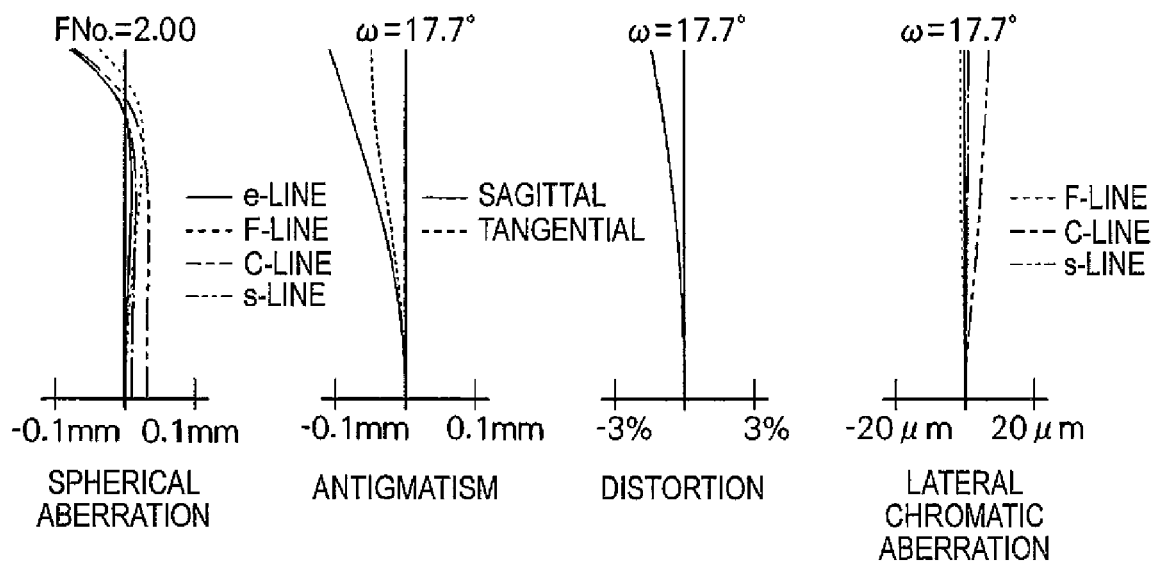
FIG. 18 is a diagram showing various aberrations of the imaging lens according to Example 1.
Figure 19:
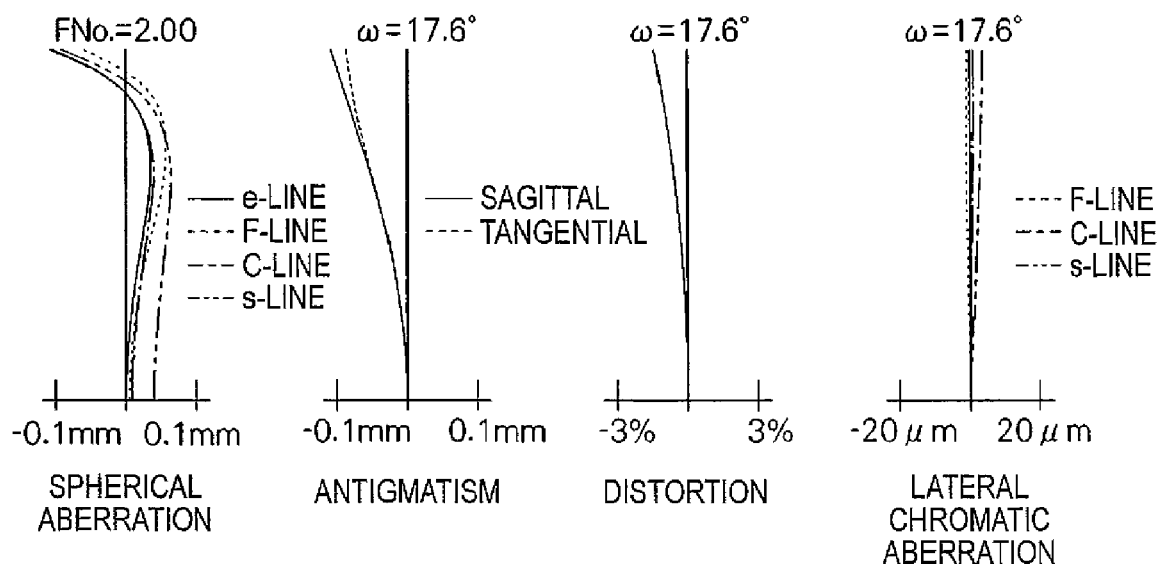
FIG. 19 is a diagram showing various aberrations of the imaging lens according to Example 2.
Figure 20:
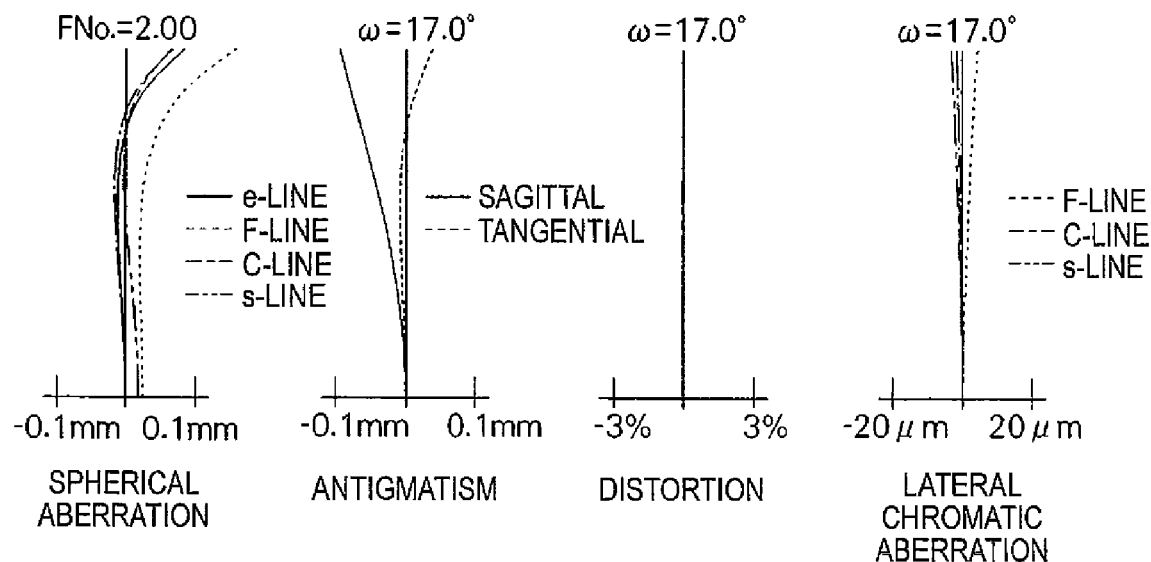
FIG. 20 is a diagram showing various aberrations of the imaging lens according to Example 3.
Figure 21:
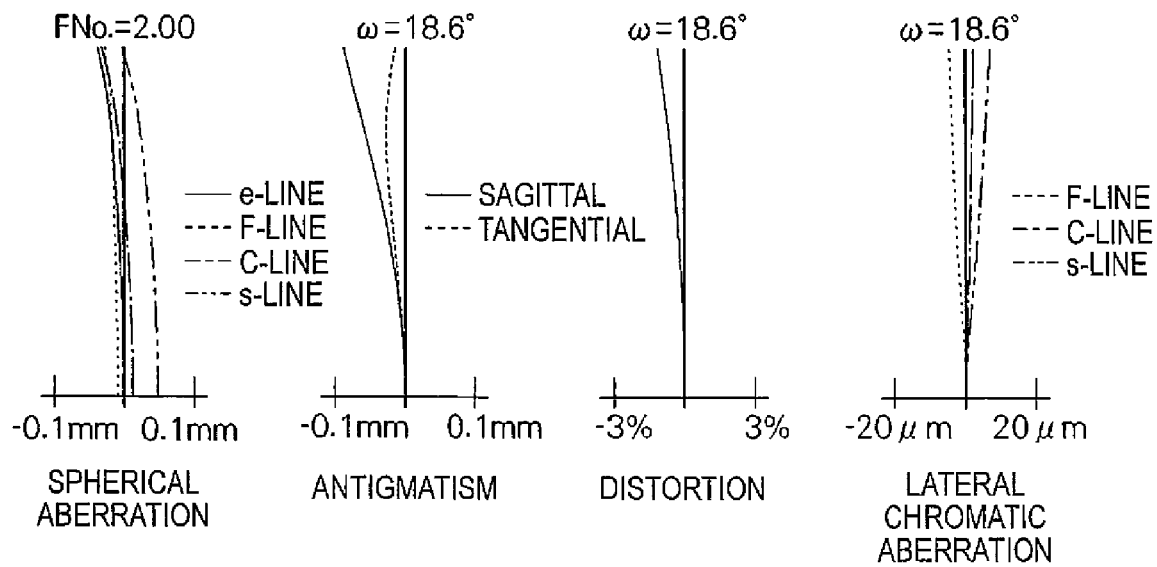
FIG. 21 is a diagram showing various aberrations of the imaging lens according to Example 4.
Figure 22:
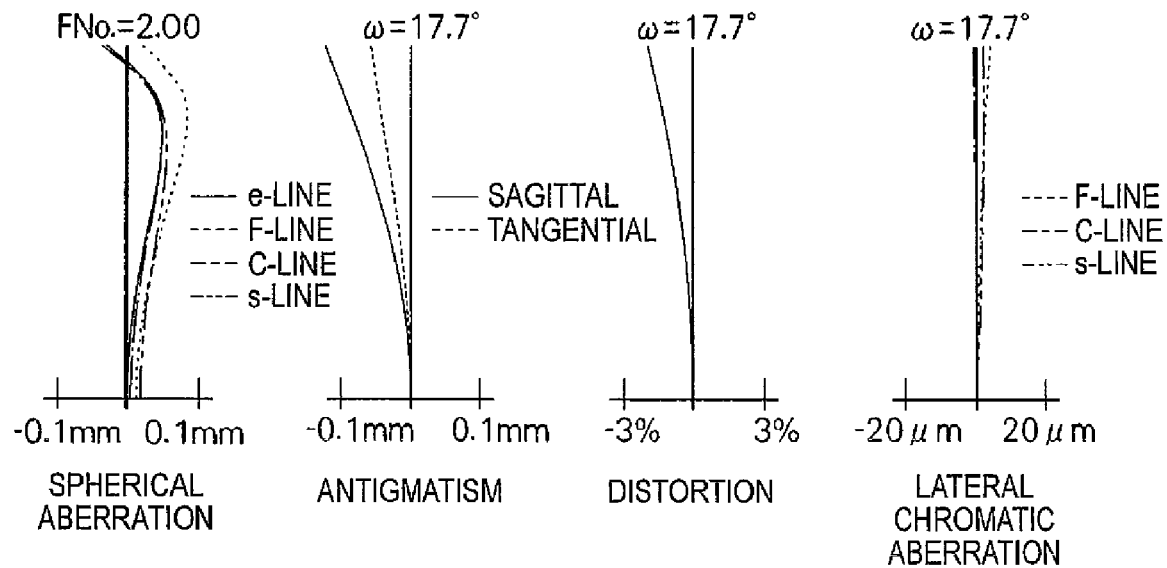
FIG. 22 is a diagram showing various aberrations of the imaging lens according to Example 5.
Figure 23:
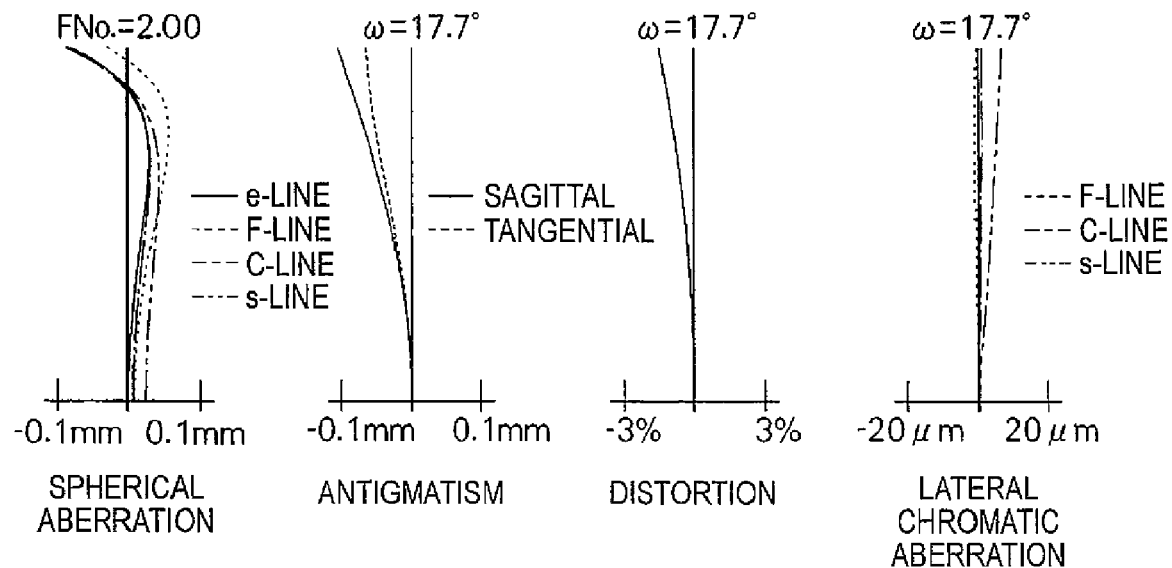
FIG. 23 is a diagram showing various aberrations of the imaging lens according to Example 6.
Figure 24:
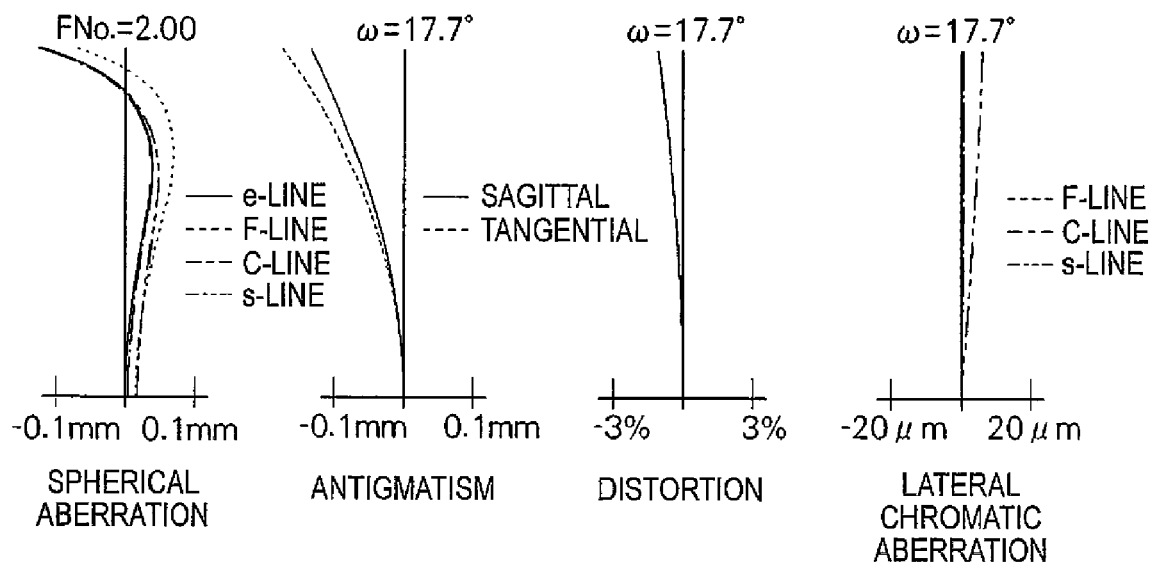
FIG. 24 is a diagram showing various aberrations of the imaging lens according to Example 7.
Figure 25:
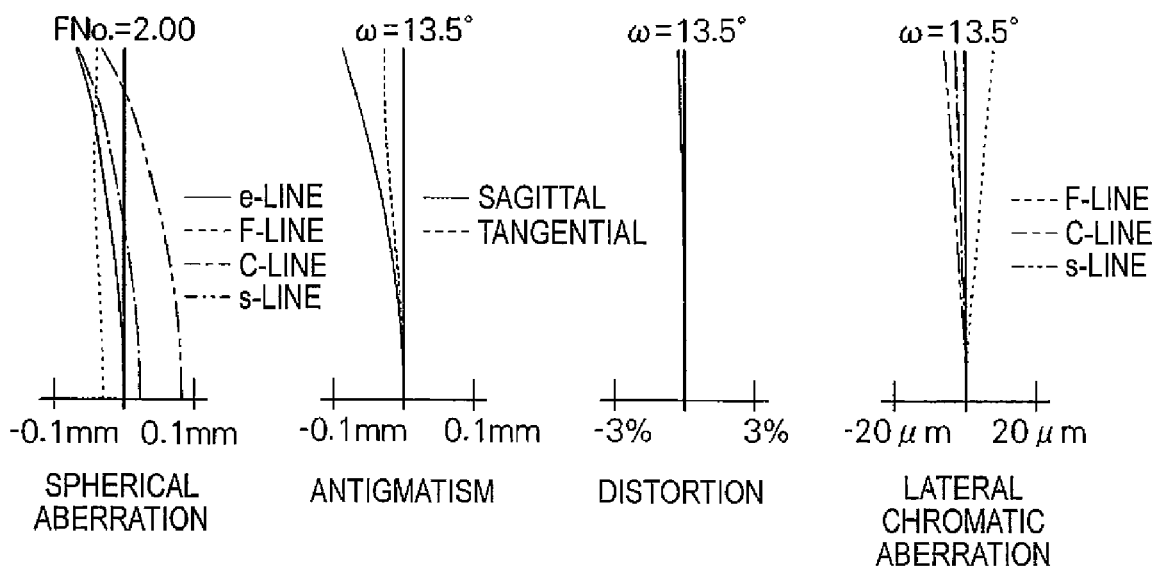
FIG. 25 is a diagram showing various aberrations of the imaging lens according to Example 8.
Figure 26:
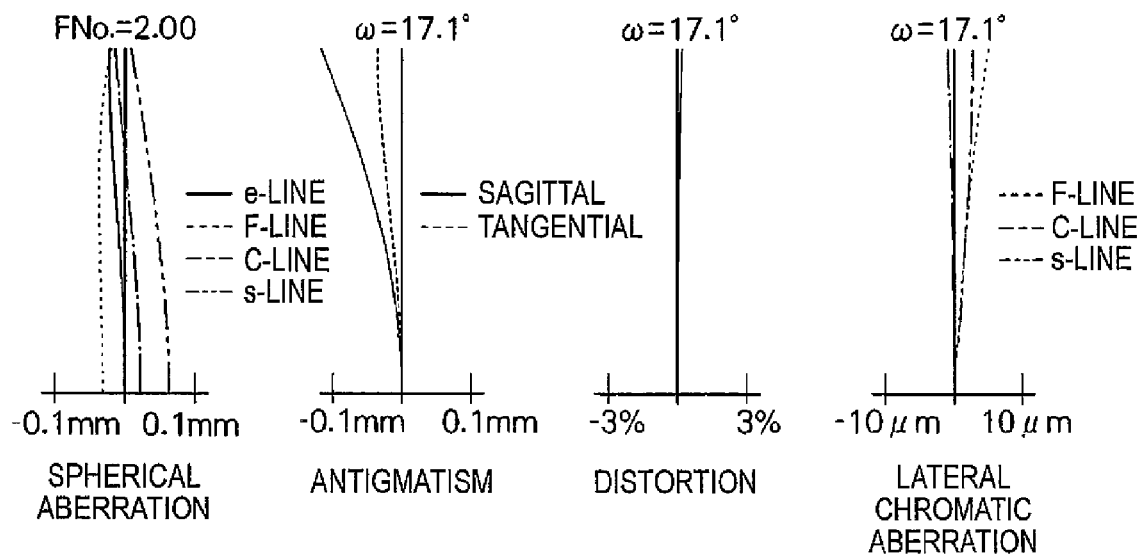
FIG. 26 is a diagram showing various aberrations of the imaging lens according to Example 9.
Figure 27:
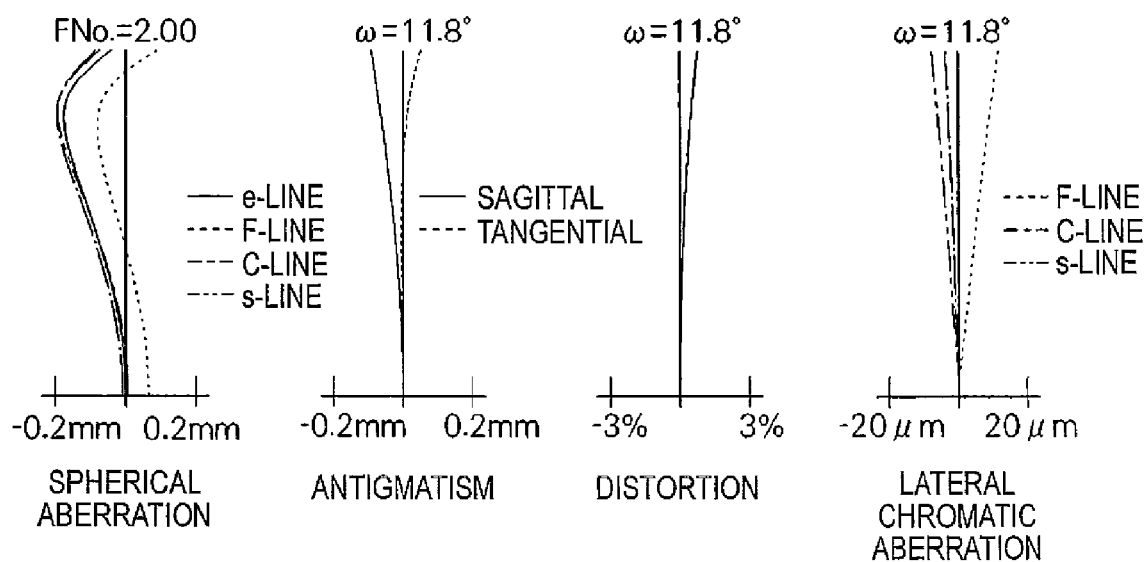
FIG. 27 is a diagram showing various aberrations of the imaging lens according to Example 10.
Figure 28:
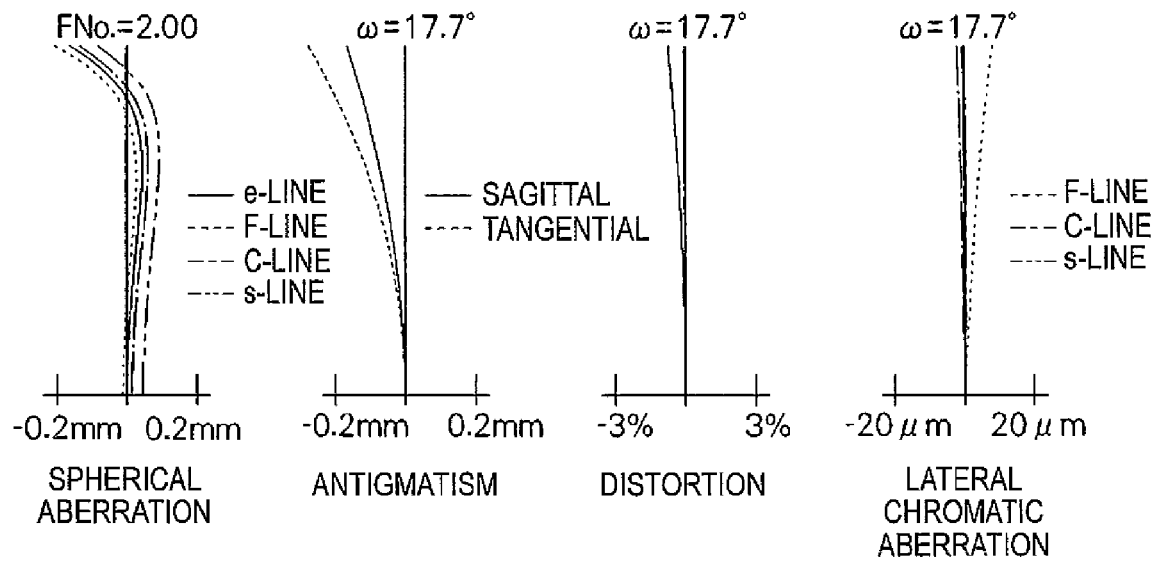
FIG. 28 is a diagram showing various aberrations of the imaging lens according to Example 1.
Figure 29:
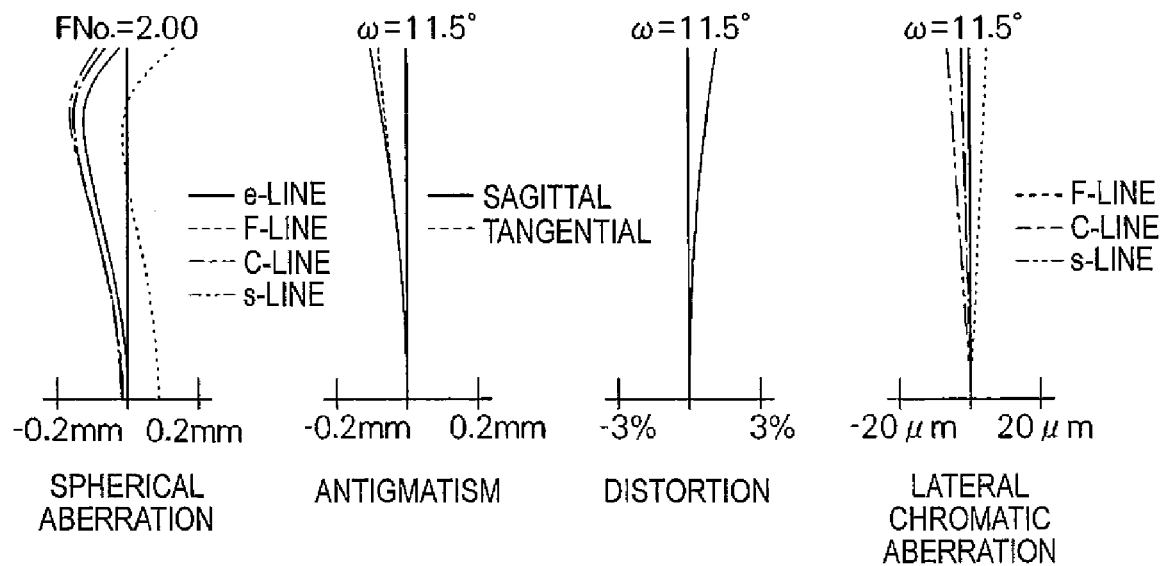
FIG. 29 is a diagram showing various aberrations of the imaging lens according to Example 12.

Table 12 shows lens data and various data of the imaging lens according to Example 12. FIG. 17 shows a lens configuration diagram. In FIG. 17, the reference signs Ri and Di correspond to the Ri and the Di in Table 12.

TABLE 12

Example 12

| SURFACE NUMBER | Ri | Di | Ndj | vdj |
|---|---|---|---|---|
| 1 | 7.68 | 4.35 | 1.7550 | 52.3 |
| 2 | 66.97 | 0.25 | | |
| 3(APERTURE DIAPHRAGM) | ∞ | 1.25 | | |
| 4 | −17.00 | 0.61 | 1.8467 | 23.8 |
| 5 | 8.88 | 3.40 | 1.5831 | 59.4 |
| 6 | −18.77 | 0.86 | | |
| 7 | 18.21 | 1.72 | 1.7550 | 52.3 |
| 8 | 120.68 | 1.61 | | |
| 9 | −4.71 | 1.58 | 1.9229 | 18.9 |
| 10 | −4.77 | 1.11 | 1.7130 | 53.9 |
| 11 | −9.08 | 2.38 | | |
| 12 | ∞ | 0.90 | 1.5168 | 64.2 |
| 13 | ∞ | 1.00 | | |
| 14(IMAGE PLANE) | ∞ | | | |

FNo. = 2.0, f = 18.3, K = 8.59, L = 20.7, ω = 11.5, Bf = 3.97

In the imaging lens according to Examples 1 to 12 mentioned above, Table 13 shows values corresponding to the conditional expressions (1) to (3). As known from Table 13, the imaging lens according to Examples 1 to 12 satisfy all of the conditional expressions (1) to (3).

TABLE 13

| | CONDITIONAL EXPRESSION | | |
|---|---|---|---|
| | (1) $L \times (1/Ra_2 - 1/Ra_1)$ | (2) K/f | (3) f/Re |
| EXAMPLE 1 | −3.94 | 0.70 | −1.09 |
| EXAMPLE 2 | −4.00 | 0.69 | −0.88 |
| EXAMPLE 3 | −3.19 | 0.58 | −0.76 |
| EXAMPLE 4 | −3.25 | 0.62 | −0.64 |
| EXAMPLE 5 | −4.29 | 0.77 | −1.10 |
| EXAMPLE 6 | −4.18 | 0.72 | −1.09 |
| EXAMPLE 7 | −4.64 | 0.69 | −1.09 |
| EXAMPLE 8 | −4.17 | 0.60 | −1.70 |
| EXAMPLE 9 | −3.48 | 0.56 | −1.11 |
| EXAMPLE 10 | −3.97 | 0.53 | −1.79 |
| EXAMPLE 11 | −4.36 | 0.65 | −1.08 |
| EXAMPLE 12 | −4.57 | 0.47 | −2.02 |

In addition, in the comparative example used in FIGS. 3 and 5, Table 14 shows values corresponding to the conditional expressions (1) to (3). As known from Table 14, the comparative example does not satisfy the conditional expressions (1) and (3).

TABLE 14

| | CONDITIONAL EXPRESSION | | |
|---|---|---|---|
| | (1) $L \times (1/Ra_2 - 1/Ra_1)$ | (2) K/f | (3) f/Re |
| COMPARATIVE EXAMPLE | −1.40 | 0.48 | 1.27 |

In the examples mentioned above, the imaging lens according to Example 10 is configured to have five elements in four groups, in which the second lens group G2 has only the lens L2. The imaging lens according to the other examples are configured to have six elements in four groups. In addition, in the imaging lens according to Examples 9 and 10, the aperture diaphragm St is disposed closest to the object side, and thus the lens group GP is formed of the first lens group G1 to the fourth lens group G4. However, in the imaging lens according to the other examples, similarly to the example shown in FIG. 1, the lens group GP is formed of the second lens group G2 to the fourth lens group G4.

FIGS. 18 to 29 are aberration diagrams showing spherical aberration, astigmatism, distortion, lateral chromatic aberration, and comatic aberration of the imaging lens according to Examples 1 to 12. In the aberration diagrams, there are shown aberrations at the e-line (a wavelength 546.07 nm) is set as a reference wavelength. However, in the spherical aberration diagrams and the lateral chromatic aberration diagrams, there are also shown aberrations at the F-line (a wavelength 486.1 nm), C-line (a wavelength 656.3 nm), and s-line (a wavelength 852.11 nm). In addition, the aberration diagram of distortion shows a deviation amount from an ideal image height expressed by f×tan θ, where f is the focal length of the whole system and θ (0≦θ≦ω) is the half angle of view. The FNo. in the spherical aberration diagram is an F number, the ω in the other aberration diagrams is a half angle of view.

As known from FIGS. 18 to 29, in Examples 1 to 12 mentioned above, the aberrations were satisfactorily corrected. In particular, chromatic aberration was satisfactorily corrected in the wide wavelength range from the visible band to the infrared band. In addition, in Examples 1 to 12 mentioned above, the optical system was configured to have an F number of 2.0, as a bight optical system appropriate to be applied to an onboard camera or a surveillance camera. As described above, since the imaging lens according to Examples 1 to 12 have a good optical performance and is configured to reduce an undesirable ghost image, the imaging lens are applicable to onboard cameras and the like in order to take images of the front, the side, and the rear of a vehicle.

Figure 30:
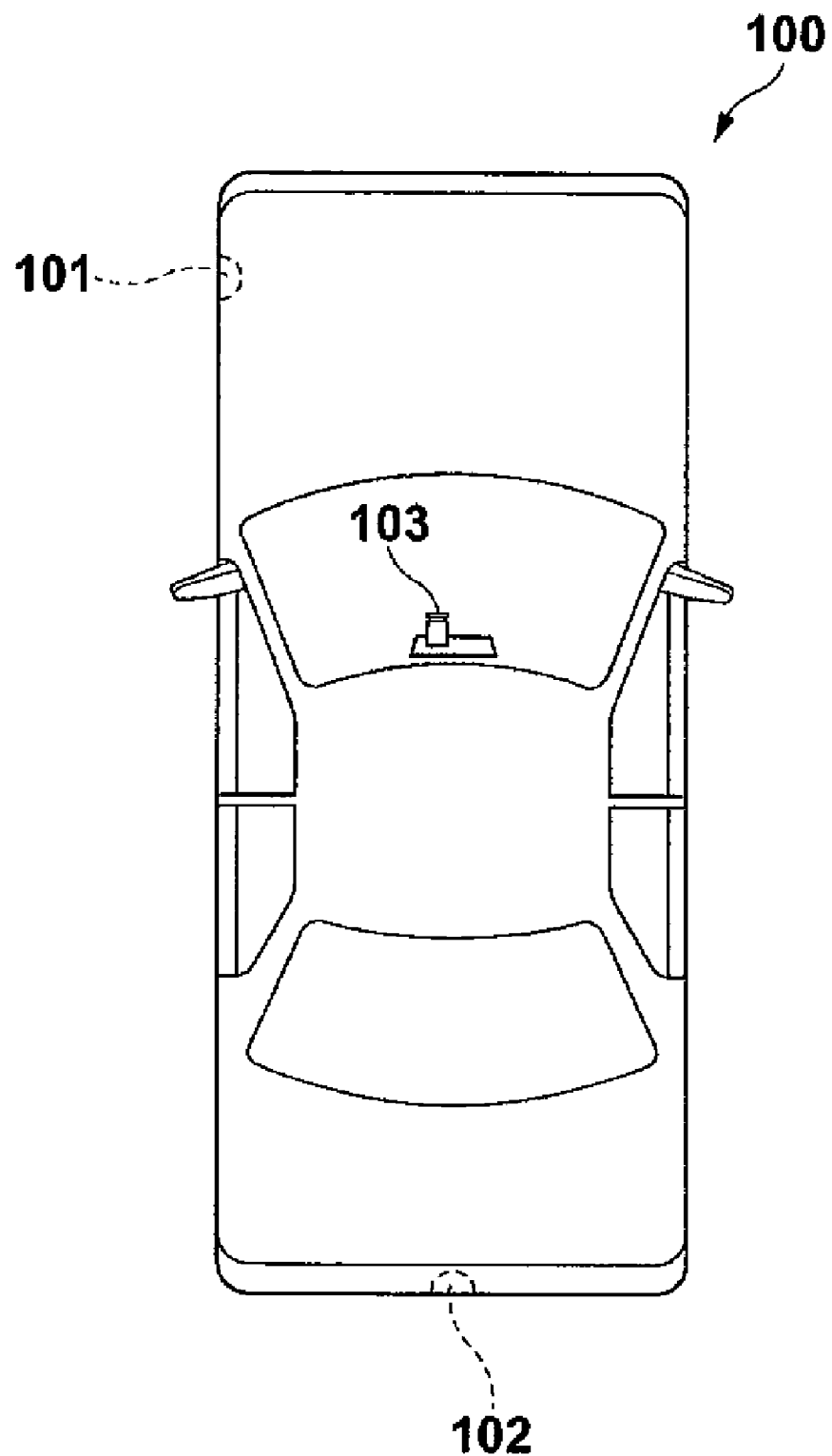
FIG. 30 is a schematic configuration diagram showing an imaging apparatus and a vehicle according to an exemplary embodiment of the invention.

FIG. 30 shows the imaging apparatus and the vehicle having the imaging apparatus according to the embodiment of the invention. In FIG. 30, the vehicle 100 includes an outside-vehicle camera 101 for photographing a blind spot area of the passenger seat side, an outside-vehicle camera 102 for photographing a blind spot area of the rear of the vehicle 100, and an in-vehicle camera 103 disposed on the rear of a room mirror and for photographing the same visual field range as a driver. The outside-vehicle camera 101, the outside-vehicle camera 102, and the in-vehicle camera 103 are the imaging apparatuses according to the embodiment of the invention, and include the imagine lens 1 according to the embodiment of the invention and the imaging device 5 converting an optical image formed by the imaging lens 1 into an electric signal.

As mentioned above, the imaging lens 1 according to the embodiment of the invention has good optical performance and is configured to reduce an undesirable ghost image. Thus, the outside-vehicle cameras 101 and 102 and the in-vehicle camera 103 can obtain a fine image, and can suppress an undesirable ghost image caused by a headlight of the oncoming vehicle. In addition, in the vehicle 100 having these cameras, driver's recognition error caused by an undesirable ghost image can be reduced, and thus it is possible to drive more safely.

The invention has been described with reference to the embodiment and the examples, but the invention is not limited to the embodiment mentioned above, and may be modified to various forms. For example, the values of a radius of curvature, an on-axis surface spacing, and a refractive index of the lens components are not limited to the values noted in the numerical examples, and can have the other values.

In addition, in the embodiment of the imaging apparatus, the example in which the invention is applied to the onboard camera has been described with reference to the drawing, but the invention is not limited to this application, and is also applicable to other imaging apparatuses such as a surveillance camera.

What is claimed is:

1. An imaging lens comprising:
   a stop; and
   a lens group disposed between the stop and an imaging plane of the imaging lens and having a positive power as a whole,
   wherein
   the lens group has an air lens with a positive power formed by an air gap between lenses adjacent to each other, the air lens being disposed in the lens group to be closer to an image side of the lens group than to an object side, and
   the imaging lens satisfies conditional expression (1):

$$-8 < L \times (1/Ra_2 - 1/Ra_1) < -3 \quad (1)$$

wherein $Ra_1$ represents a radius of curvature of an object-side surface of the air lens, $Ra_2$ represents a radius of curvature of an image-side surface of the air lens, and L represents a distance on an optical axis of the imaging lens from an object-side surface of a lens closest to an object side of the imaging lens to the imaging plane, wherein
   at least one lens surface exposed to the air lens has an anti-reflection coating having a reflectance of less than 2% for light having a wavelength of 800 nm.

2. The imaging lens according to claim 1, further satisfying conditional expression (2):

$$0.3 < K/f < 1.0 \quad (2)$$

wherein K represents a distance on the optical axis from the object-side surface of the air lens to the imaging plane, and f represents a focal length of the imaging lens.

3. The imaging lens according to claim 1, further satisfying conditional expression (3):

$$-4 < f/Re < 0.2 \quad (3)$$

wherein f represents a focal length of the imaging lens, and Re represents a radius of curvature of an image-side surface of the lens closest to the image side in the imaging lens.

4. The imaging lens according to claim 1, wherein the image-side surface of the air lens has a convex shape.

5. The imaging lens according to claim 1, which is mounted on a vehicle to take an outside image of the vehicle.

6. An imaging apparatus comprising:
   an imaging lens according to claim 1; and
   an imaging device converting an optical image formed by the imaging lens into an electric signal.

7. A vehicle comprising an imaging apparatus according to claim 6.

8. The imaging lens according to claim 2, further satisfying conditional expression (3):

$$-4 < f/Re < 0.2 \quad (3)$$

wherein f represents a focal length of the imaging lens, and Re represents a radius of curvature of an image-side surface of the lens closest to the image side in the imaging lens.

9. The imaging lens according to claim 2, wherein the image-side surface of the air lens has a convex shape.

10. The imaging lens according to claim 2, which is mounted on a vehicle to take an outside image of the vehicle.

11. An imaging apparatus comprising:
    an imaging lens according to claim 2; and
    an imaging device converting an optical image formed by the imaging lens into an electric signal.

12. A vehicle comprising an imaging apparatus according to claim 11.

13. The imaging lens according to claim 1, wherein the air lens has a biconvex shape and the object-side surface of the air lens has a positive radius of curvature.

14. The imaging lens according to claim 1, wherein the air lens has a meniscus shape and the object-side surface of the air lens has a negative radius of curvature.

15. The imaging lens according to claim 1, wherein the air lens has a plano-convex shape and the object-side surface of the air lens has a substantially infinite radius of curvature.

* * * * *